United States Patent
Venugopalan et al.

(10) Patent No.: US 11,995,162 B2
(45) Date of Patent: May 28, 2024

(54) METHOD AND APPARATUS FOR MANAGING UNLOCKING OF AN ELECTRONIC DEVICE

(71) Applicant: Samsung Electronics Co., Ltd., Suwon-si (KR)

(72) Inventors: Hari Krishnan Thiruvalli Venugopalan, Bangalore (IN); Mineni Niswanth Babu, Bangalore (IN); Gaurav Gupta, Delhi (IN); Sri Lakshmi Punuru, Bangalore (IN); Gopinath Chennakeswaran, Bangalore (IN); Ashish Kumar Singh, Bangalore (IN); Ravindra Kumar Mishra, Kormangala (IN); Rajaram Hanumantacharya Naganur, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 17/254,515

(22) PCT Filed: Jul. 18, 2019

(86) PCT No.: PCT/KR2019/008895
§ 371 (c)(1),
(2) Date: Dec. 21, 2020

(87) PCT Pub. No.: WO2020/017903
PCT Pub. Date: Jan. 23, 2020

(65) Prior Publication Data
US 2021/0224372 A1     Jul. 22, 2021

(30) Foreign Application Priority Data

Jul. 18, 2018 (IN) .............................. 201841026854
Jul. 5, 2019 (IN) .............................. 201841026854

(51) Int. Cl.
*G06F 9/4401* (2018.01)
*G06F 1/3203* (2019.01)
(Continued)

(52) U.S. Cl.
CPC ............ *G06F 21/32* (2013.01); *G06F 9/4418* (2013.01); *G06F 21/45* (2013.01)

(58) Field of Classification Search
CPC .......... G06F 21/32; G06F 21/45; G06F 21/31; G06F 9/4418; G06F 9/445; G06F 1/3203; G06F 3/0484; Y02D 10/00; H04L 9/3231
See application file for complete search history.

(56) References Cited

U.S. PATENT DOCUMENTS

| | | |
|---|---|---|
| 8,311,514 B2 | 11/2012 | Bandyopadhyay et al. |
| 9,967,100 B2 | 5/2018 | Hong et al. |

(Continued)

FOREIGN PATENT DOCUMENTS

| | | |
|---|---|---|
| CN | 102508591 A | 6/2012 |
| CN | 105740690 A | 7/2016 |

(Continued)

OTHER PUBLICATIONS

Extended European Search Report dated May 6, 2021, issued in European Patent Application No. 19837850.7.
(Continued)

*Primary Examiner* — Vu V Tran
(74) *Attorney, Agent, or Firm* — Jefferson IP Law, LLP

(57) ABSTRACT

Methods and systems for managing unlocking of an electronic device are provided. A method includes receiving an unlocking input from a user, authenticating the unlocking input, generating a first pre-wakeup command of initializing a progress action for the electronic device, generating a second pre-wakeup command of whether to complete the progress action or to retrogress the progress action based on
(Continued)

the authenticating of the unlocking input, and determining whether to unlock the electronic device based on the second pre-wakeup command.

16 Claims, 17 Drawing Sheets

(51) Int. Cl.
  *G06F 3/0484* (2022.01)
  *G06F 9/445* (2018.01)
  *G06F 21/31* (2013.01)
  *G06F 21/32* (2013.01)
  *G06F 21/45* (2013.01)
  *H04L 9/32* (2006.01)

(56) References Cited

U.S. PATENT DOCUMENTS

| | | | |
|---|---|---|---|
| 10,318,313 B2 | 6/2019 | Sol | |
| 2006/0184780 A1 | 8/2006 | Yamada et al. | |
| 2011/0275348 A1* | 11/2011 | Clark | H04W 12/06 |
| | | | 455/411 |
| 2012/0007713 A1 | 1/2012 | Nasiri et al. | |
| 2013/0018551 A1* | 1/2013 | Fuchs | B60R 25/00 |
| | | | 701/49 |
| 2014/0229727 A1 | 8/2014 | Jun | |
| 2018/0101711 A1* | 4/2018 | D'Souza | G06V 40/1306 |
| 2018/0330146 A1 | 11/2018 | Wang et al. | |
| 2019/0347181 A1* | 11/2019 | Cranfill | G06F 21/6218 |
| 2020/0089859 A1* | 3/2020 | Guan | G06F 9/4406 |

FOREIGN PATENT DOCUMENTS

| | | |
|---|---|---|
| CN | 106020782 A | 10/2016 |
| CN | 106096367 A | 11/2016 |
| CN | 106886703 A | 6/2017 |
| CN | 106951761 A | 7/2017 |
| CN | 107231677 A | 10/2017 |
| CN | 107423595 A | 12/2017 |
| CN | 107566650 A | 1/2018 |
| CN | 107944361 A | 4/2018 |
| EP | 3 355 223 A1 | 8/2018 |
| EP | 3 454 239 A1 | 3/2019 |
| KR | 10-2015-0051888 A | 5/2015 |
| KR | 10-2017-0034644 A | 3/2017 |
| WO | 2017/215567 A1 | 12/2017 |

OTHER PUBLICATIONS

Chinese Office Action dated Feb. 6, 2024, issued in Chinese Application No. 201980043796.X.

* cited by examiner

METHOD AND APPARATUS FOR MANAGING UNLOCKING OF AN ELECTRONIC DEVICE

TECHNICAL FIELD

The disclosure relates to managing unlocking of an electronic device. More particularly, the disclosure relates to performing pre-wakeup events for faster unlocking of the electronic device.

BACKGROUND ART

Generally, electronic devices can be unlocked by authenticating inputs acquired from a user. Examples of the inputs can be, but is not limited to, passwords, patterns, biometric inputs and so on. However, in current electronic devices, a biometric based unlocking takes considerable time compared to a power-key wakeup with direct unlocking. This is due to several reasons like performing a plurality of time consuming tasks only after successful authentication. Examples of the time consuming tasks can be, but is not limited to, display initialization, screen preparation and so on.

The above information is presented as background information only to assist with an understanding of the disclosure. No determination has been made, and no assertion is made, as to whether any of the above might be applicable as prior art with regard to the disclosure

DISCLOSURE OF INVENTION

Solution to Problem

Methods and systems for managing unlocking of an electronic device are provided. A method includes receiving an unlocking input from a user, authenticating the unlocking input, generating a first pre-wakeup command of initializing a progress action for the electronic device, generating a second pre-wakeup command of whether to complete the progress action or to retrogress the progress action based on the authenticating of the unlocking input, and determining whether to unlock the electronic device based on the second pre-wakeup command.

Advantageous Effects of Invention

The disclosure enables to unlock an electronic device fast and power efficiently by simultaneously authenticating a user input and initializing a boot-up progress action.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

BEST MODE FOR CARRYING OUT THE INVENTION

Figure 1A:
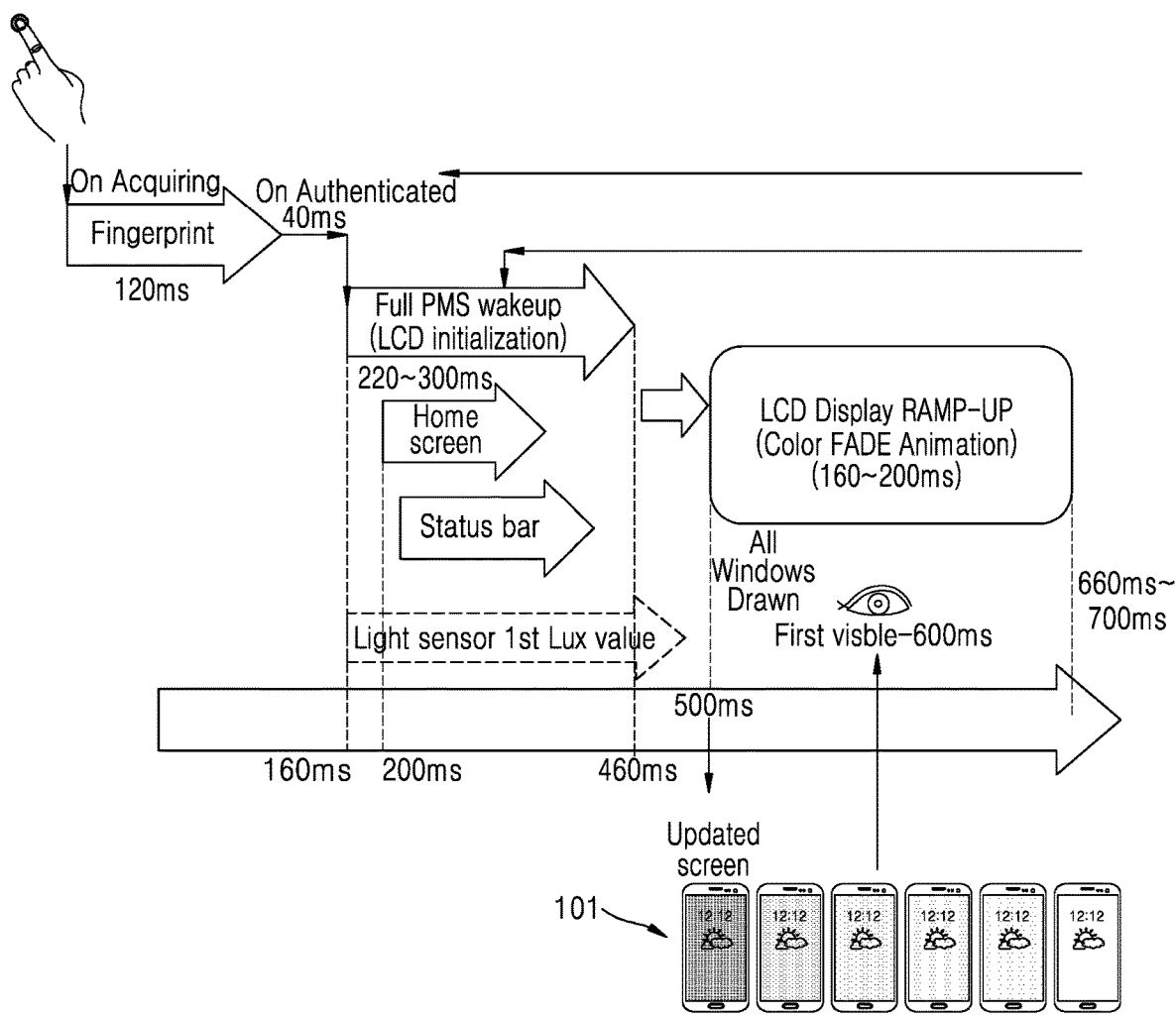
FIG. 1A illustrates a method for unlocking an electronic device using a biometric input, according to an embodiment.

In an embodiment, a method is provided for managing unlocking of an electronic device are provided. The method includes receiving an unlocking input from a user, authenticating the unlocking input, generating a first pre-wakeup command of initializing a progress action for the electronic device, generating a second pre-wakeup command of whether to complete the progress action or to retrogress the progress action based on the authenticating of the unlocking input, and determining whether to unlock the electronic device based on the second pre-wakeup command.

In an embodiment, provided is an apparatus for managing unlocking from a locked state, the apparatus comprising: an input sensor configured to receive an unlocking input from a user, a processor configured to: perform an authentication of the unlocking input, generate a first pre-wakeup command of initializing a progress action for the apparatus, generate a second pre-wakeup command of whether to complete the progress action or to retrogress the progress action based on the authenticating of the unlocking input, and determine whether to unlock the apparatus from the locked state based on the second pre-wakeup command.

Accordingly, the embodiments herein provide methods and systems for managing unlocking of an electronic device. A method disclosed herein includes receiving an unlocking input from a user, authenticating the unlocking input, generating a first pre-wakeup command of initializing a progress action for the electronic device, generating a second pre-wakeup command of whether to complete the progress action or to retrogress the progress action based on the authenticating of the unlocking input, and determining whether to unlock the electronic device based on the second pre-wakeup command.

Accordingly, the embodiments herein disclose an apparatus including an input sensor configured to receive an unlocking input from a user, a processor configured to perform an authentication of the unlocking input, generate a first pre-wakeup command of initializing a progress action for the apparatus, generate a second pre-wakeup command of whether to complete the progress action or to retrogress the progress action based on the authenticating of the unlocking input, and determine whether to unlock the apparatus from the locked state based on the second pre-wakeup command.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Embodiments herein disclose methods and systems for managing unlocking of an electronic device based on at least one pre-wakeup event. On acquiring a biometric input from a user for unlocking the electronic device, at least one pre-wakeup event can be performed for initialization of at least one hardware module or at least one software module of the electronic device partially. On successful authentication of the biometric input, the initialization of the at least one hardware module or at least one software module can be completed to unlock the electronic device. Referring now to the drawings, and more particularly to FIGS. 2 through 9, where similar reference characters denote corresponding features consistently throughout the figures, there are shown example embodiments.

FIG. 1A illustrates a method for unlocking an electronic device using a biometric input, according to an embodiment. Referring to FIG. 1A, a user provides a biometric input for unlocking the electronic device.

In an embodiment, the biometric input can be a fingerprint input, an iris input, voice input, a vein scanning input, a face input, and so forth. Upon receiving the fingerprint input of the user, the electronic device authenticating the fingerprint input. The authentication may include determining whether the fingerprint image derived from the fingerprint input meets a predetermined criteria. In an embodiment, the authentication is successful if the fingerprint input matches the stored fingerprint by more than 95% accuracy. If authentication is successful, the electronic device wakes up a power manager which manages various power consuming components such as a display, light sensors, applications and so on in the electronic device with an initialization of a progress action. The initialization of the progress action may include actions such as, but not limited to, a display initialization, a home screen composition (including preparation of a home screen or a screen bar), a light sensor wakeup and so on. As shown in 101, the initialization of the progress action may include brightening the display from a dimmed state to a full bright state.

However, performing the initialization of the progress action only after the successful authentication of the user input causes a delay in unlocking the electronic device compared to a normal power key wake-up. In an example, the delay can be about 120-160 ms. For example, the display initialization can consume 220-330 ms, the light sensor provides ambient luminent value (Lux value) only after more than 200 ms, and the home screen composition happens in parallel with the display initialization. Thus, the progress action followed by the successful authentication approximately consumes 500 ms in the electronic device.

Once the home screen composition is ready (all the windows such as, but not limited to, a status bar, a navigation bar, a wallpaper and so on are drawn on the home screen), the electronic device adaptively powers on a backlight of the display which can be referred as a color-fade animation so that contents of the home screen can be visible to the user. However, the color-fade animation performed only after the composition of the home screen causes a delay of the home screen visibility. In an example, the color-fade animation can consume 160 ms in a normal light condition. The color-fade animation can consume 180 ms in a dark room condition. These durations can be added up to a total unlock time of nearly 700 ms. Thus, slower color-fade animation can give a perception of the electronic device unlocking slowly.

Figure 1B:
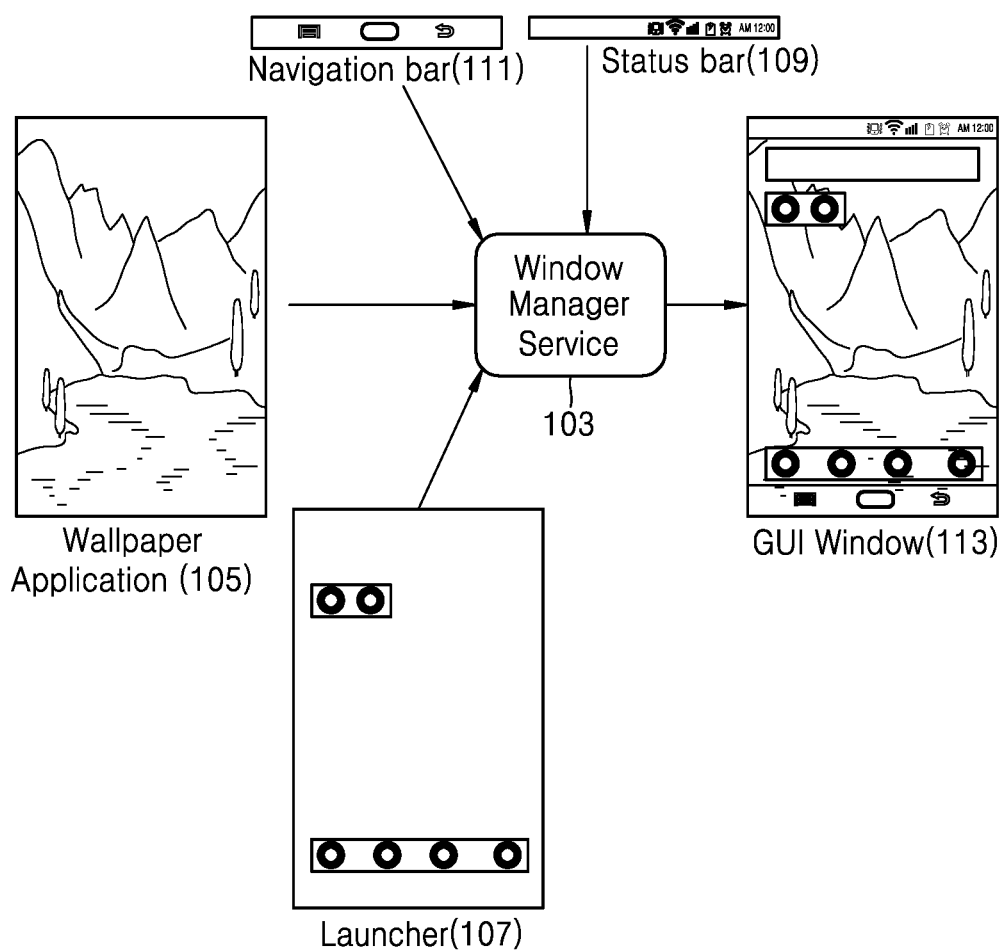
FIG. 1B illustrates a method for composing a home screen during unlocking of an electronic device, according to an embodiment.

FIG. 1B illustrates a method for composing a home screen during unlocking of an electronic device, according to an embodiment.

Referring to FIG. 1B, a window manager service (WMS) 103 of the electronic device starts composing or launching a home screen in parallel with the display initialization only after the successful authentication. The WNS 103 receives information required for composing the home screen from a plurality of sources such as, but not limited to, a wallpaper application 105, a launcher 107, a status bar application 109, a navigation bar application 111 and so on. The information can be at least one of a battery update, a network status update, a notification update and so on. The WMS 103 composes Graphical User Interface (GUI) window 113 on receiving the information from the plurality of sources and provides the GUI window 113 for composing and rendering the home screen (including a basic first frame) on the display. However, the plurality of sources may consume much time to provide the information/updates to the window manager service and provide repeated updates on top of initial data provided. Thus, the composing of the home screen (including all the frames) may be delayed, which in turn causes a delay in unlocking of the electronic device.

Figure 1C:
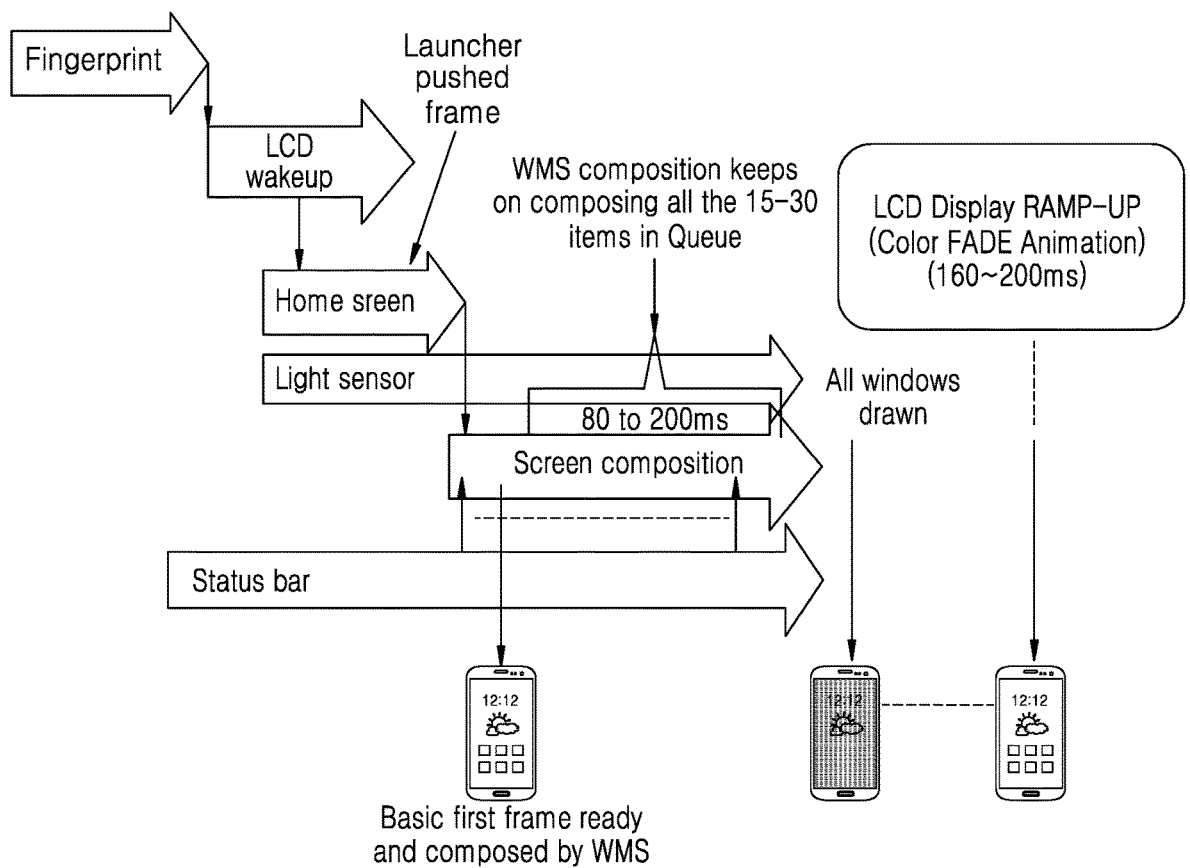
FIG. 1C illustrates a method for composing a home screen during unlocking of an electronic device, according to an embodiment.

FIG. 1C illustrates a method for composing a home screen during unlocking of an electronic device, according to an embodiment. Referring to FIG. 1C, such delay due to processing the continuous information/update can be around 8 to 200 ms depending upon a number of screen updates provided to the WMS 103 for composing the home screen.

Figure 1D:
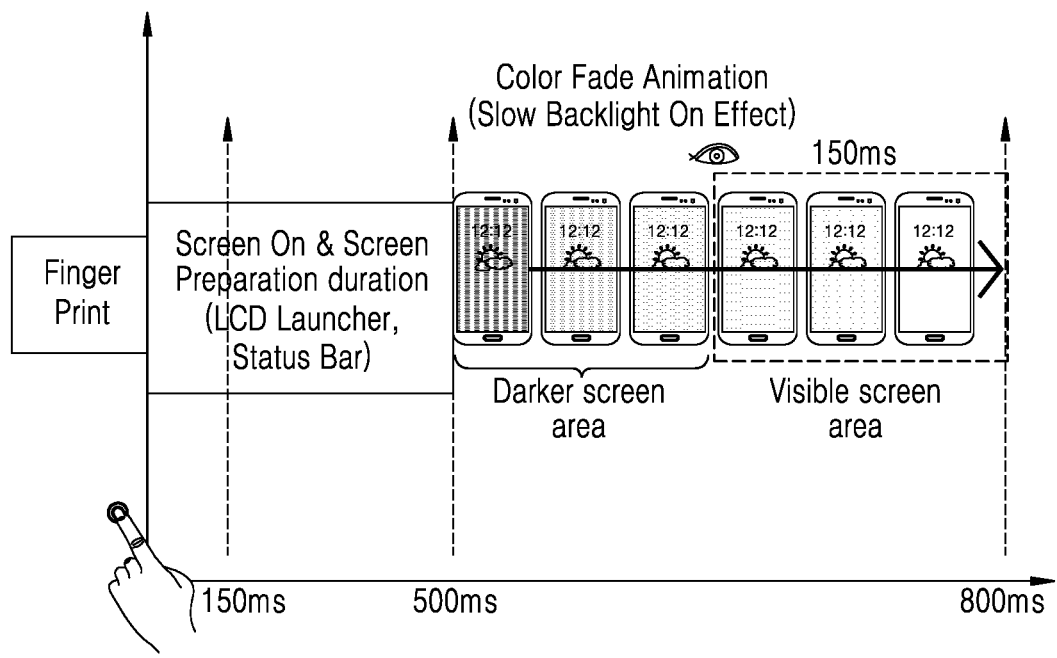
FIG. 1D illustrates a method of powering-on a backlight of a display during unlocking of an electronic device, according to an embodiment.
Figure 1D:
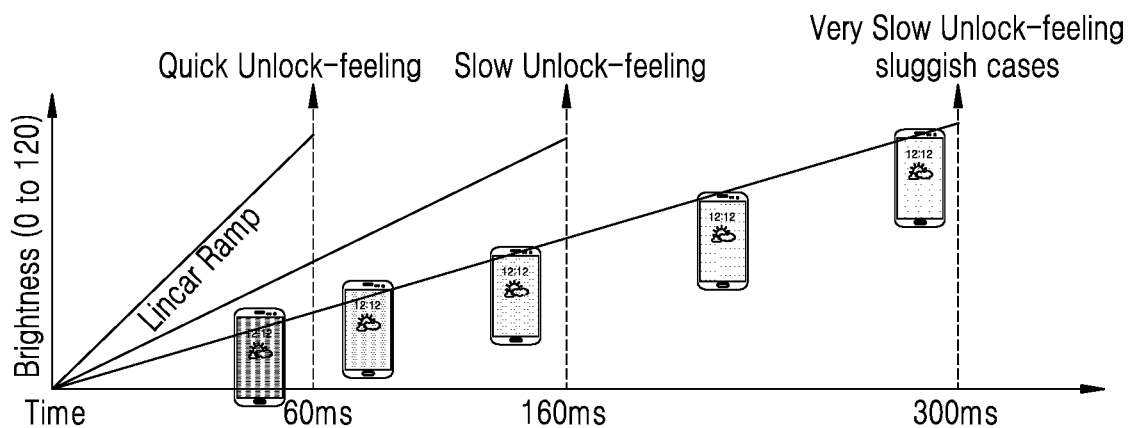

FIG. 1D illustrates a method of powering-on a backlight of a display during unlocking of an electronic device, according to an embodiment. The electronic device may turn on or power on a backlight of the display by performing the color-fade animation once the display is initialized to perform a progress action and the home screen is composed. The color-fade animation can be performed by following a linear animation style with a fixed duration. According to the linear animation style, the backlight of the display can be turned on by starting with lower brightness and can be varied according to the electronic device performance. However, turning-on the backlight of the display starting with the lower brightness causes longer duration of animation to be spent in lower brightness, which may not be visible to the user. Further, the linear animation style in a visible screen area may not give a quick unlocking visibility to the user. In addition, the duration of the color-fade animation may vary according to the capability of the electronic device, which further gives a perception of slower unlocking visibility on a device having a low capability.

Figure 1E:
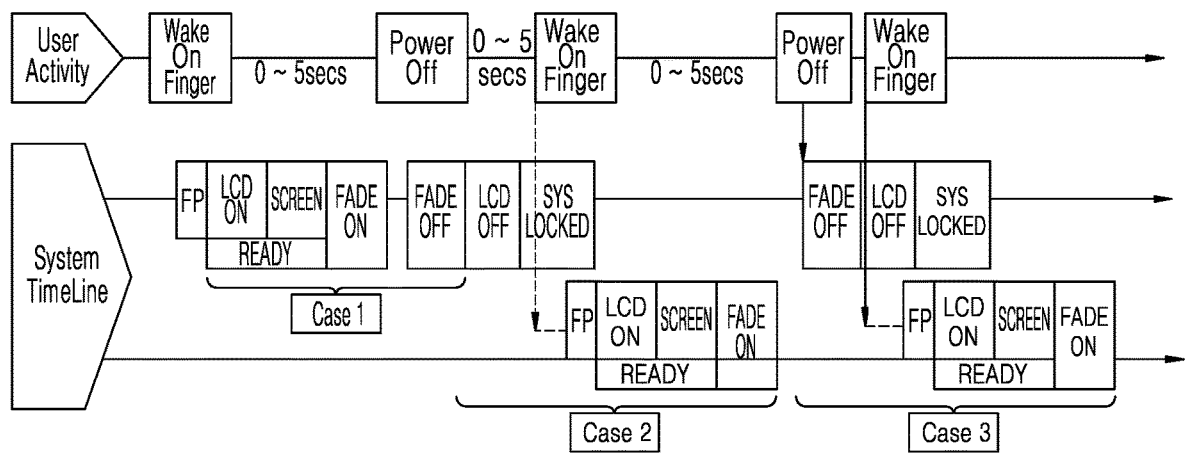
FIG. 1E illustrates a method for managing unlocking of an electronic device on obtaining consecutive fingerprints inputs, according to an embodiment.

FIG. 1E illustrates a method for managing unlocking of an electronic device on obtaining consecutive user inputs, according to an embodiment.

Referring to FIG. 1E, after authenticating the user input, the electronic device may initialize a progress action to wakeup modules or components such as a display, light sensors, applications and so on, depicted by LCD-ON/SCREEN READY in FIG. 1E for unlocking and turning on the backlight of the display by the color-fade animation which is shown by FADE-ON in FIG. 1E. On determining the power-off (for example: within 0-5 seconds of a wakeup of the modules as shown in FIG. 1E) followed by the unlocking/wakeup, the electronic device may turn off the backlight of the display (fade OFF) and ramps down the initialization of the progress action depicted by LCD-OFF (case 1). Further, the electronic device may acquire the user input such as a fingerprint input within 5 seconds from the previous power-off operation as shown in case 1. In such a scenario, the electronic device is required to turn on the backlight of the display (fade ON), and wakeup the modules or the components immediately even though the modules are not turned OFF completely (case 2). Further, the electronic device may acquire the user input immediately followed by the power-off. In such scenario, after authenticating the user input also, the user may not be able to access the modules or the components since the modules or the components are in an OFF state. Further, the electronic device consumes more time for turning-on the modules or the components (case 3).

Figure 1F:
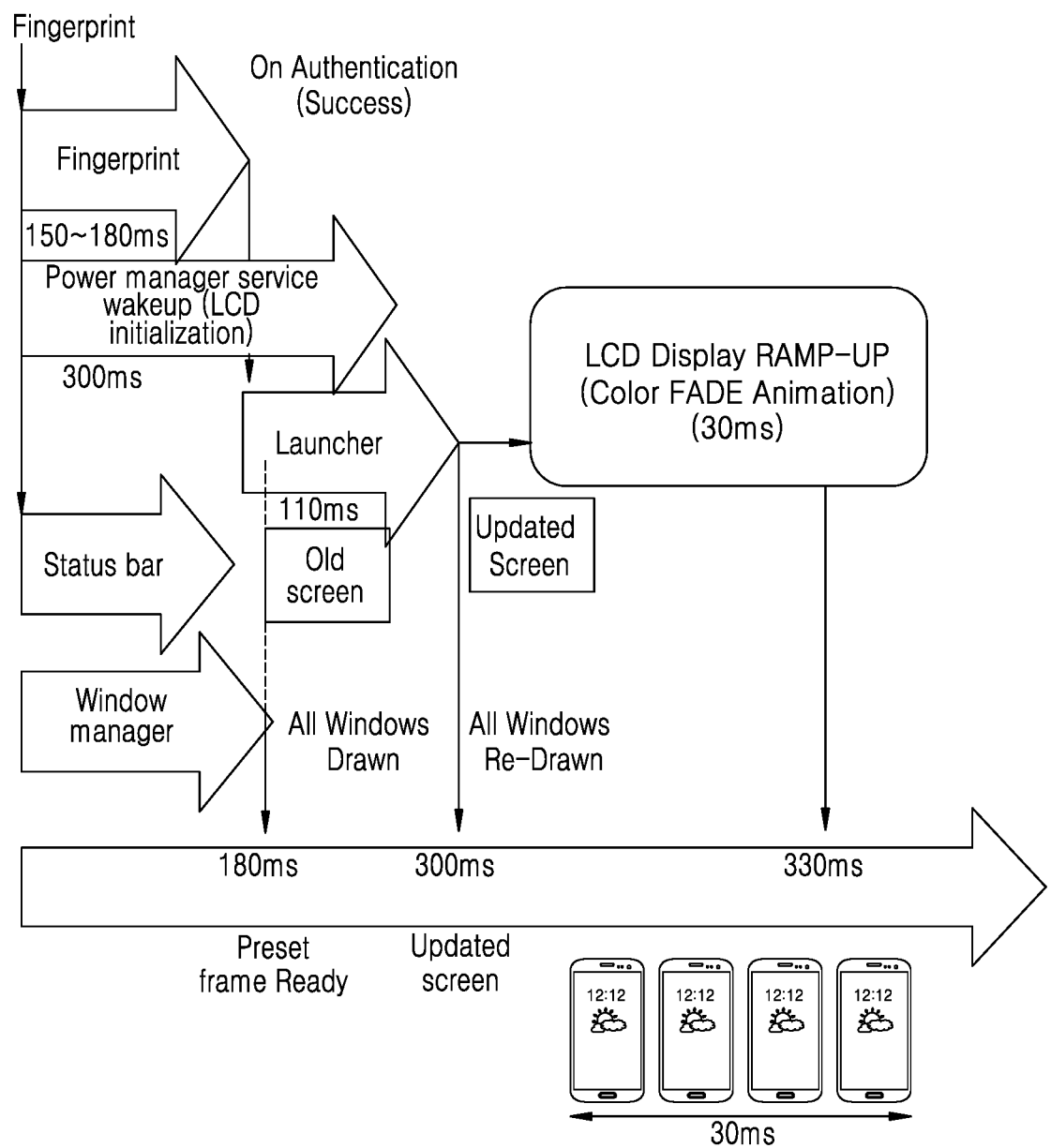
FIG. 1F illustrates a a method for unlocking an electronic device using a biometric input with unoptimized parallelization, according to an embodiment.

FIG. 1F illustrates a method for unlocking an electronic device using a biometric input with unoptimized parallelization, according to an embodiment.

Referring to FIG. 1F, the electronic device initialize a progress action to completely wakeup the modules or the components such as the display, the light sensor, the applications and so on in parallel with the authentication of the user input for faster unlocking. However, the electronic device may perform the initialization of the progress action irrespective of checking whether the user input is authenticated or not. Thus, when the authentication is not successful, the performed initialization of the progress action may result in a lot of power consumption by consuming unnecessary processor resources. Thus this parallelizing method may produce the desired fast unlocking performance, but it may result in a power-wastage due to full-wakeup of power manager service and giving SCREEN-ON notification, DEVICE-UNLOCKED or KEYGUARD-UNLOCKED to all modules causing inconsistency in unlock behavior, since the steps of this method are performed without a full authentication. Also, hardware components or modules such as LCD, light sensors, touch-screen sensors and so on which may be added in the future may be fully waken up, since the power manager service is fully waken up before a completion of the successful authentication.

Figure 2:
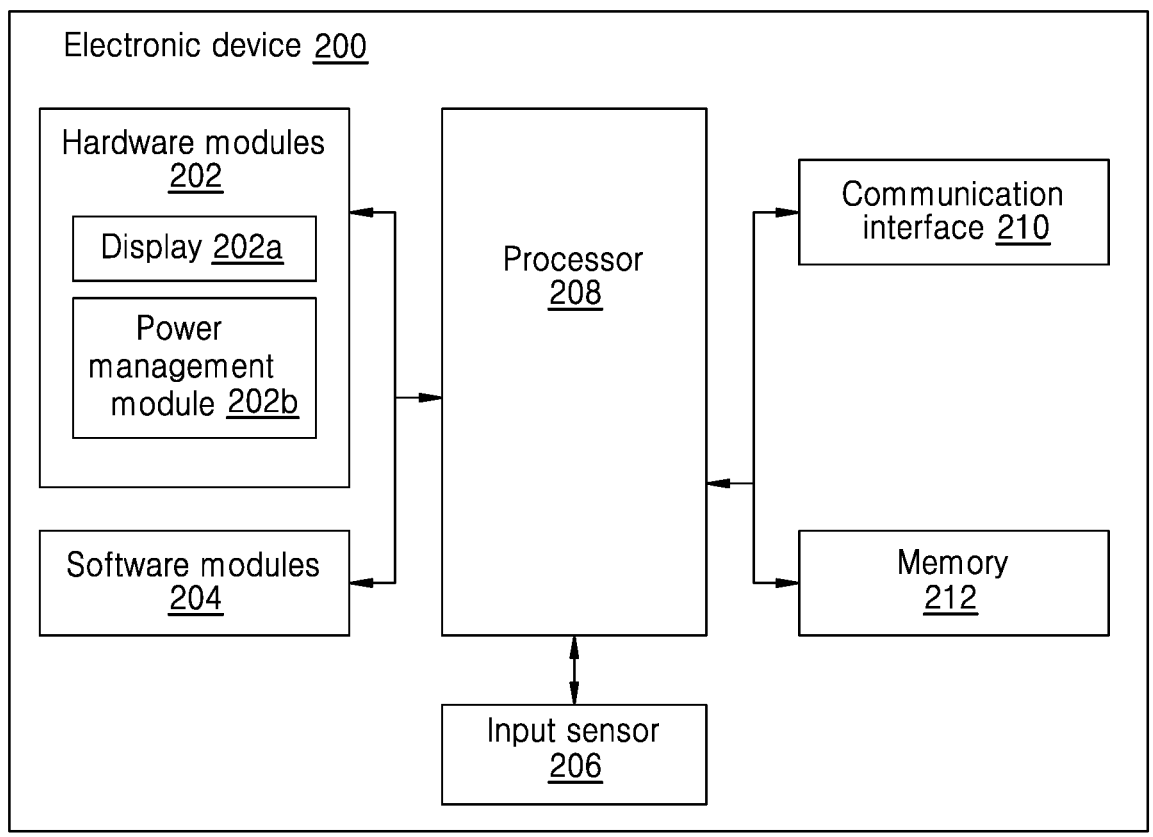
FIG. 2 illustrates a block diagram of an electronic device, according to an embodiment.

FIG. 2 illustrates a block diagram of an electronic device, according to an embodiment.

The electronic device 200 can be a digital device supporting authentication of a user inputting biometric input(s). Examples of the electronic device 200 can be, but is not limited to, a mobile phone, a smartphone, tablet, a phablet, a personal digital assistant (PDA), a laptop, a computer, a wearable device, a smart watch, an IoT (Internet of Things) device, a wearable computing device, a vehicle infotainment system, a medical device, a camera, a Virtual Reality (VR) device, a vehicle display or any other device capable of being unlocked using at least one biometric input.

The electronic device 200 can be in a locked state in order to avoid unauthorized use of functionalities, services and information. The applications can be, but is not limited to, a calendar application, a navigation application, a messaging application, a gaming application, a health and fitness application, a weather application, a camera application, a web browser, a video streaming application, a payment application, a financial application, an education application, a news application, a shopping application, a utility application and so on.

The electronic device 200 may enter into a locked state based on conditions such as, but not limited to, when the electronic device 200 is powered up, when the user locks the electronic device 200 manually, when the user does not use the electronic device 200 for the time being. The electronic device 200 can be unlocked based on an authentication of the user. The electronic device 200 can be unlocked in order to provide the user an access to the functionalities, the services and the information of the electronic device 200.

The electronic device 200 may include hardware modules 202, software modules 204, input sensor(s) 206, a processor 208, a communication interface 210 and a memory 212. The electronic device 200 can also communicate with external databases and a server (not shown) to access the functionalities, the services, the information and so on using a communication network. Examples of the communication network can be at least one of the Internet, a wired network, a wireless network (a Wi-Fi network, a cellular network, Wi-Fi Hotspot, Bluetooth, Zigbee and so on) and so on.

The hardware modules 202 and the software modules 204 can be triggered to wakeup/initialize the unlocking of the electronic device 200. Further, the hardware modules 202 and the software modules 204 can be coupled with managing units such as, but not limited to, a surface flinger unit, and/or a sensor managing unit. The managing units can control functionalities of the hardware modules 202 and the software modules 204 based on pre-defined configurations/settings.

The hardware modules 202 can include at least one of sensors, a display 202a, and a power management module 202b for managing a battery of the electronic device. Examples of the sensors can be, but is not limited to, an ambient light sensor, a video sensor, an audio sensor (a microphone), a resistive touch sensor, a capacitive touch sensor, an optical sensor, a motion sensor, a gyroscope sensor, a user's gaze tracing sensor, a proximity sensor or any other sensor embedded within the electronic device 200.

Examples of the display 202a can be at least of a Liquid Crystal Display (LCD), an Organic Light Emitting Diode (OLED), an Active Matrix OLED (AMOLED), a flexible display, a foldable display, a bendable display, an electroluminescent display and so on. The display 202a can be configured to provide a Graphical User Interface (GUI) screen/window as an interface to the user for interacting with the electronic device 200. The display 202a can be further configured to provide a home screen to the user. The home screen can be a Graphical User Interface (GUI) screen, which displays contents that act as links to the functionalities, the services, the information and so on. Examples of the contents can be, but not limited to, a media (a wallpaper, an image, a video, an animation, and so on), text, an icon, a widget, a notification, an application, a status bar, a navigation bar and so on. The contents of the home screen can be arranged according to pre-defined settings selected by the user. Embodiments herein use the terms "home screen", "home window", "home page", "primary page" and so on interchangeably to refer to a screen with the contents arranged according to one or more pre-defined settings selected by the user. Further, the home screen can include a plurality of windows/screens including a pre-determined number of contents that act as links to the functionalities, the services, the information and so on. Further, the display 202a can be associated with a display control hardware such as, but not limited to, backlights, light sensors, optical films and so on. The display control hardware can vary brightness of the display 202a, so that the contents displayed on the display 202a can be visible to the user.

The software modules 204 may be a memory or a database storing a plurality of software applications and may be configured to prepare the contents (that act as links to the functionalities, the services, the information and so on) to be displayed on the display 202a. Examples of the software applications can be, but is not limited to, a wallpaper application, a launcher, a status bar application and so on. The wallpaper application may identify a wallpaper (one of the contents) selected by the user for the home screen and provide the identified wallpaper to the display 202a for displaying the wallpaper to the user. The launcher can prepare icons (the contents) that can be displayed on the home screen, wherein the icons can be the links for the applications. The launcher can prepare the icons by collecting data from the applications present in the electronic device 200. The status bar application can prepare the status bar (the content) that is to be displayed on the home screen of the display 202a, wherein the status bar can provide information about the functionalities such as, but not limited to, a battery status, a network status, notifications and so on.

The input sensor(s) 206 may be configured to receive or acquire user inputs including biometric input(s) from the user for unlocking the electronic device 200. Examples of the biometric inputs can be, but is not limited to, a fingerprint input, an iris input, a face input, a voice input, a palm printing input, a vein input and so on. The input sensor 202 may be, but is not limited to, a fingerprint sensor, an iris scanner, a camera, a microphone and so on to acquire the biometric inputs of the user. The input sensor 206 provides the acquired biometric input to the processor 208.

The processor 208 may be at least one of a single processer, a plurality of processors, multiple homogenous cores, multiple heterogeneous cores, multiple Central Processing Unit (CPUs) of different kinds and so on. The processor 208 can be configured to unlock the electronic device 200 by authenticating the biometric input acquired from the user. Unlocking the electronic device 200 involves wakeup/initialization of a progress action for the hardware modules 202 and the software modules 204 by displaying the home screen on the display 202a. A wakeup of at least one of the hardware modules 202 and the software modules 204 allows the user to access the functionalities, the services, the information and so on by interacting with the contents of the home screen displayed on the display 202a.

In an embodiment, the processor 208 may perform at least one pre-wakeup event and at least one pre-wakeup continue event to unlock the electronic device 200. The processor 208 performs the pre-wakeup event(s) in parallel with the authentication of the biometric input acquired from the user. The pre-wakeup event(s) can be an initialization of the progress action for the hardware modules 202 and the software modules 204 of the electronic device 200 partially. Once the authentication of the biometric input is successful, the processor 208 performs the pre-wakeup continue event(s) to complete the initialization of the hardware modules 202 and software modules 204 for unlocking the electronic device 200.

The communication interface 210 can be configured to establish a communication between the electronic device and external entities such as, but not limited to, the external databases, the server and so on using the communication network.

The memory 212 stores one or more biometric templates of the user which is used for comparing with biometric input of the user, pre-defined configurations/settings of the hardware modules 202 and the software modules 204, the home screen composition, contents prepared by the software modules 204 and so on. The memory 212 may include one or more computer-readable storage media. The memory 212 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 212 may, in some examples, be considered a non-transitory storage medium. The term "non-transitory" may indicate that the storage medium is not embodied in a carrier wave or a propagated signal. However, the term "non-transitory" should not be interpreted to mean that the memory 212 is non-movable. In some examples, the memory 212 can be configured to store larger amounts of information than the memory. In certain examples, a non-transitory storage medium may store data that can, overtime, change (e.g., in Random Access Memory (RAM) or cache).

FIG. 2 may illustrate exemplary units of the electronic device 200, but it is to be understood that other embodiments are not limited thereto. In other embodiments, the electronic device 200 may include less or more number of units. Further, the labels or names of the units are used only for illustrative purpose and does not limit the scope of the embodiments herein. One or more units can be combined together to perform same or substantially similar function in the electronic device 200.

Figure 3:
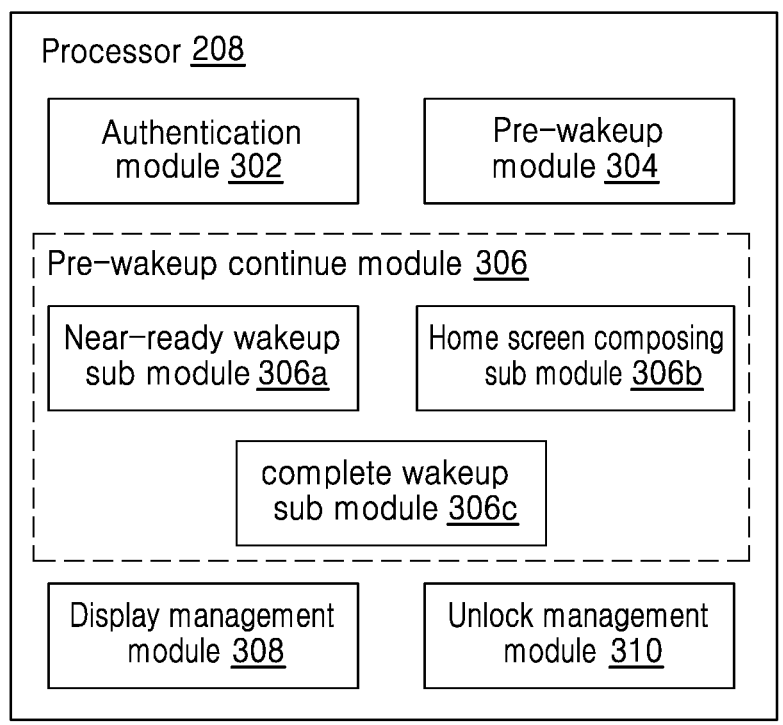
FIG. 3 is a block diagram illustrating a processor for unlocking of an electronic device, according to an embodiment.

FIG. 3 is a block diagram illustrating a processor for unlocking of an electronic device, according to an embodiment. The processor 208 may include an authentication module 302, a pre-wakeup module 304, a pre-wakeup continue module 206, a display management module 208 and a unlock management module 210. The authentication module 302 and the pre-wakeup module 304 can be operated in parallel on acquiring the biometric input of the user by the input sensor 206.

The authentication module 302 can be configured to authenticate the biometric input of the user. The authentication module 302 compares the biometric input of the user acquired by the input sensor 206 with the corresponding biometric template of the user which is pre-stored in the memory 212. The authentication module 302 determines that the authentication of the biometric input is successful if the acquired biometric input meets the biometric template stored in the memory 212. In an embodiment, if the acquired biometric input meets a predetermined criteria such as 95% matching between the biometric template and the biometric input, the authentication is determined to be successful. The authentication module 302 determines that the authentication of the biometric input is unsuccessful if the acquired biometric input does not match the biometric template stored in the memory 212.

The pre-wakeup module 304 may be configured to perform the at least one pre-wakeup event to trigger the partial initialization of the hardware modules 202 and the software modules 204. The at least one pre-wakeup event can be performed in parallel with the authentication of the biometric input received from the user. On acquiring the biometric input of the user, the pre-wakeup module 304 generates at least one pre-wakeup command for initializing a progress action for the electronic device 200 and sends the pre-wakeup command(s) to the hardware modules 202 and the software modules 204 through the managing unit associated with the hardware modules 202 and the software modules 204 for the initialization of the progress action. The pre-wakeup command(s) may launch a partial initialization/wakeup state. The partial initialization may be an initialization of a pre-defined action based on power consumption and/or capability of the electronic device 200. In an example, the partial initialization can be pre-defined in such a way that typical power consumption does not exceed 100 mA in the electronic device 200. In an example herein, the pre-defined partial initialization state can be 60% of the initialization state. On receiving the pre-wakeup command, the hardware modules 202 and the software modules 204 performs at least one preparatory activity in order to achieve the partial initialization state. The preparatory activities can be module specific activities such as, but not limited to, software intensive activities, hardware intensive activities and so on. Examples of the software intensive activities can be, but not limited to, home-screen preparation, status bar preparation and so on. Examples of the hardware intensive activities can be activities related to the hardware modules such as, but not limited to, LCD or LED panel, light sensor and so on. The hardware modules 202 and the software modules 204 may perform the at least one preparatory activity based on the associated pre-defined configuration/initialization settings.

Embodiments herein are further explained using the preparatory activities of the display 202a and the ambient light sensor (the hardware modules 202) as examples, but it should be noted that the preparatory activities of other hardware modules can be varied based on the pre-defined configuration/initialization settings associated with the other hardware modules. In an example, consider the display 202a (the LCD display) as one of the hardware modules 202 and the managing unit can be associated with the LCD display 202a. On receiving the pre-wakeup command through the managing unit and the display 202a can perform the preparatory activities such as, but not limited to, LCD reset, loading registers, and so on by achieving the pre-defined partial initialization state. Thus, the display 202a can be partially initialized to display the home screen. In another example, consider an ambient sensor can be one of the hardware modules 202 and the sensor managing unit (the managing unit) can be associated with the ambient light sensor. On receiving the pre-wakeup command through the sensor managing unit, the ambient light sensor wakes up partially and performs the preparatory activities to estimate an ambient luminent value (Lux value) for the LCD display 202a in order to display the home screen.

Embodiments herein are further explained using the preparatory activities of the status bar application module and the launcher module (the software modules 204) as examples, but it should be noted that the preparatory activities of other software modules can be varied based on the pre-defined configuration/initialization settings associated with the other software modules. In an example, consider the status bar application module as one of the software modules 204 and the sensor managing unit (the managing unit) can be associated with the status bar application module. On receiving the pre-wakeup command through the sensor managing unit, the status bar application module wakes up partially (wherein the status bar application module performs only specific functions to achieve the partial initialization state) and starts collecting updates from the at least one of the functionalities, the applications and information present in the electronic device 200 to prepare the content/status bar, which is required to be displayed on the home screen. The status bar application module can prepare the status bar according to the pre-defined settings selected by the user. In another example, consider the launcher module as one of the software modules 204 and the sensor managing unit (the managing unit) can be associated with the launcher module. On receiving the pre-wakeup command through the sensor managing unit, the launcher module wakes up partially (performs only specific functions to achieve the pre-defined partial initialization state) and prepares the contents that is required to be displayed on the home screen. The launcher module can prepare the content by collecting information from the applications according to the pre-defined settings selected by the user. In an example, the content prepared by the launcher can be icons/modules acting as the links for accessing the applications present in the electronic device 200. In an embodiment, the pre-wakeup module 304 can also be configured to perform the pre-wakeup event for complete initialization of the at least one module (202, 204) when power consumption of the initialized at least one module (202, 204) is negligible and based on availability of the processor 208 of the electronic device 200.

The pre-wakeup continue module 306 can be configured to perform the at least one pre-wakeup continue event to complete the initialization of the hardware modules 202 and the software modules 204. The pre-wakeup continue module 306 may perform the at least one pre-wakeup event based on the authentication of the biometric input of the user. If the entire hardware or software module wakeup is completed during the pre-wakeup event itself, then no action will be done for the pre-wakeup continue event. If the authentication of the biometric input is unsuccessful, the pre-wakeup continue module 306 ramps down (stops or retrogress) the initialization of the hardware modules 202 and the software modules 204 of the electronic device 200 and thereby prevents unlocking of the electronic device 200. If the authentication of the biometric input is successful, the pre-wakeup continue module 306 then performs the pre-wakeup continue event for unlocking the electronic device 200. The pre-wakeup continue event involves continuing the initialization of the hardware modules 202 and the software modules 204 to achieve a near-ready state, composing the plurality of windows of the home screen (which are to be displayed on the display 202a) while continuing the initialization and completing the initialization of the hardware modules 202 and the software modules 204 once a first window of the home screen is ready. The pre-wakeup continue module 306 includes a near-ready wakeup sub module 306a, a home screen composing sub module 306b and a complete wakeup sub module 306c. The near-ready wakeup sub module 306a and the home screen composing sub module 306b can operate in parallel.

On determining that the user has been successfully authenticated, the near-ready wakeup sub module 306a generates a pre-wakeup continue command and sends the pre-wakeup continue command to the hardware modules 202 and the software modules 204 through the associated managing unit to continue their initialization until achieving the near-ready state. The pre-wakeup continue command can indicate the near-ready state that is pre-defined for the hardware modules 202 and the software modules 204. In an example herein, the near-ready state can be 90% of the initialized state. The near ready state can be dependent on at least one of the hardware modules 202 and the software modules 204. For example, if the hardware module 202 is the LCD/display module, then the near-ready wakeup sub module 306 sends the pre-wakeup continue command to the LCD display to continue the initialization till a loading of the display buffer memory pointers into the device. In case of home-screen preparation the respective content providing modules for the home-screen can be ready with content such as launcher, status bar and so on. On receiving the pre-wakeup continue command, the hardware modules 202 and the software modules 204 can be configured to continue the preparatory activities until achieving the near ready state.

The home screen composing sub module 306b can be configured to compose the plurality of windows of the home screen that needs to be displayed while unlocking the electronic device 200. The home screen composing sub module 306b starts collecting the information from at least one of the hardware modules 202 and the software modules 204. For example, the collected information from the hardware modules 202 can indicate a current state (for example; a wakeup state) of the display, the touch screen unit, the key guard, the sensors and so on. The collected information from the software modules can be the contents (the icons, the status bar, the navigation bar, the window and so on) that are required to display on the home screen. Based on the collected information from the hardware modules 202 and the software modules 204, the home screen composing sub module 306b starts composing the plurality of windows of the home screen. In an example herein, the home screen composing sub module 306b keeps composing the content of the home screen based on the contents provided from the software modules 204 such as launcher, status bar and so on. Further, the software modules 204 keep providing their updated versions to the home screen composing sub module 206b for repeated composition of the windows/content of the home screen. Once the first window of the home screen is composed, the home screen composing sub module 306b sends information about the first window of the home screen to the complete wakeup sub module 304c. Further, the home screen composing sub module 306b stores the first window in a form of frame in the memory 212. Thereafter, the home screen composing sub module 306b proceeds with composing of remaining windows of the home screen. Thus, a very first frame that could be made visible is kept ready quickly, while the home screen composing sub module 306b can keep updating on top of the first frame based on updated versions provided by respective content providers/software modules 204.

The complete wakeup sub module 306c can be configured to complete the initialization of the hardware modules 202 and the software modules 204 after composing the first window of the home screen. The complete wakeup sub module 306c can generate a full wakeup command and sends the full wakeup command to the hardware modules 202 and the software modules 204 through the associated managing units. On receiving the full wakeup command, the hardware modules 202 and the software modules 204 can resume the preparatory activities from where they originally left during pre-wakeup event to complete their initializations. For example, in case of LCD panel, the display buffer pointer is loaded into the display controller for the screen to be visible, and for the initiation of the color-fade animation referring to the procedure for slowly turning-on the backlight. Thus, unlocking the electronic device 200. In an example, on receiving the full wakeup command, the display 202a can prepare a display buffer by loading a start address of the memory 210 to fetch and render the first window of the home screen. In another example, on receiving the full wakeup command, the launcher module can start collecting updates from the applications and updates the previously prepared icons.

Once the hardware modules 202 and the software modules 204 are completely initialized, the home screen composing sub module 306b starts preparing the remaining windows of the home screen by obtaining updates from the hardware modules 202 and the software modules 204 that are completely activated/initialized.

The display management module 308 can be configured to vary the brightness of the display 202*a* so that the windows of the home screen displayed on the display 202*a* can be visible to the user. The display management module 308 can vary the brightness of the display 202*a* by turning ON the display control hardware (such as, but not limited to, backlights, light sensors, optical films and so on) of the display 202*a* with specific brightness. In an example, once the first window of the home screen is composed, the display management module 308 performs a dynamic color-fade animation following an exponential ramp up style to vary the brightness of the display 202*a*. In an embodiment, the home screen composing sub module 306*b* can compose the remaining windows of the home screen in parallel with the dynamic color-fade animation. Thus, resulting in faster unlocking of the electronic device 200.

The dynamic color-fade animation involves turning-on the display control hardware with a lower brightness and varying the brightness in incremental steps. In an embodiment, the display management module 308 selects a duration for performing the color-fade animation based on a total time consumed for unlocking the electronic device 200 (complete wakeup of the hardware modules 202 and the software modules 204). Consider an example scenario, wherein 320 ms may be consumed for unlocking the electronic device 200, then the display management module 308 performs the dynamic color-fade animation of 80 ms. The dynamic color-fade animation provides consistent home screen visibility and unlocking time in normal and sluggish conditions (when the electronic device performance is slow).

The unlock management module 310 can be configured to manage the state of the hardware modules 202 and the software modules 204 on determining a back-to-back or a consecutive unlocking scenario. The back-to-back unlocking scenario or the consecutive unlocking scenario can be a scenario, where the unlocking is detected followed by a power-off and immediately by another biometric input acquisition for unlocking the electronic device 200 within a pre-defined duration. The pre-defined duration can be varied adaptively based on OFF and ON operation determined during every back-to-back unlocking scenario. The OFF and ON operation can be determined using at least one of a learning and predictive algorithm, a simple weighted average algorithm and so on. The device is declared for back to back unlocking scenario when the gap between the lock key press for either locking or unlocking is within pre-defined threshold (for example: 5 seconds, i.e. within 5 second of performing unlocked activity, the user pressed again for locking and vice versa).

On determining the back-to-back unlocking scenario, the unlock management module 310 unlocks the electronic device 200 by only turning off the display control hardware (such as, but not limited to, backlights, light sensors, optical films and so on) of the display 202*a* by pushing a blank screen to ensure high safety and security. However, the unlock management module 310 enables the at least one of the hardware modules 202 and the software modules of the electronic device 200 to continue in the current state.

FIG. 3 illustrates an exemplary implementation of the processor 208, but it is to be understood that other embodiments are not limited thereon. In other embodiments, the processor 208 may include less or more number of components. Further, the labels or names of the units are used only for illustrative purpose and does not limit the scope of the embodiments herein. One or more units can be combined together to perform same or substantially similar function in the processor 208.

Figure 4A:
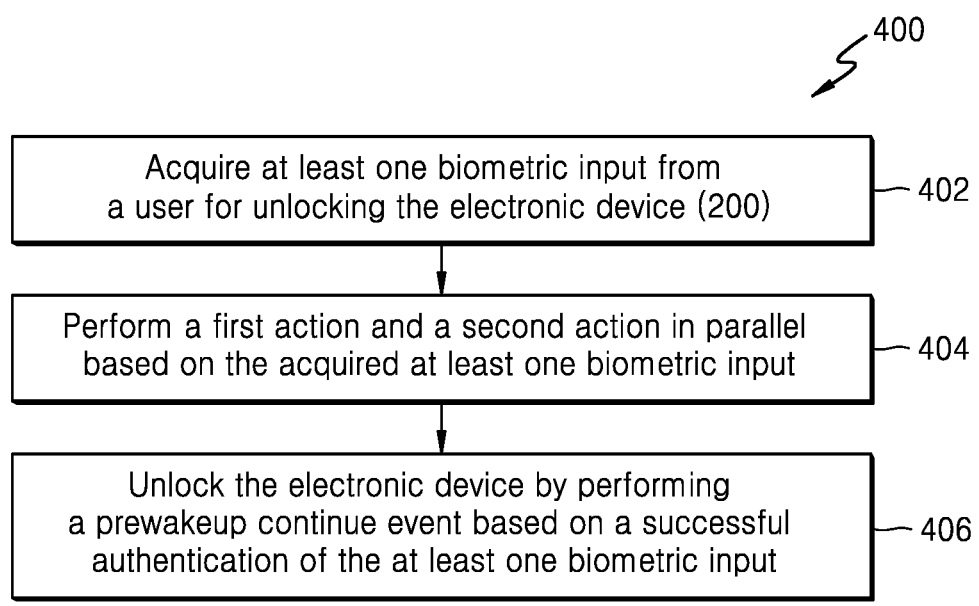
FIG. 4A illustrates a flow diagram for managing unlocking of an electronic device, according to an embodiment.

FIG. 4A illustrates a flow diagram for managing unlocking of an electronic device, according to an embodiment In operation 402, the method includes acquiring, by the electronic device 200, the biometric input from a user for unlocking the electronic device.

In operation 404, the method includes performing, by the electronic device 200, a first action and at least one second action in parallel based on the acquired at least one biometric input. The first action includes authenticating the acquired at least one biometric input. The second action includes performing the pre-wakeup event for initialization of the at least one module (202, 204) of the electronic device (200) partially.

In operation 406, the method includes performing unlocking, by the electronic device 200, the pre-wakeup continue event based on the successful authentication of the biometric input. The pre-wakeup event is performed to complete the initialization of the at least one module (202, 204) of the electronic device 200.

Figure 4B:
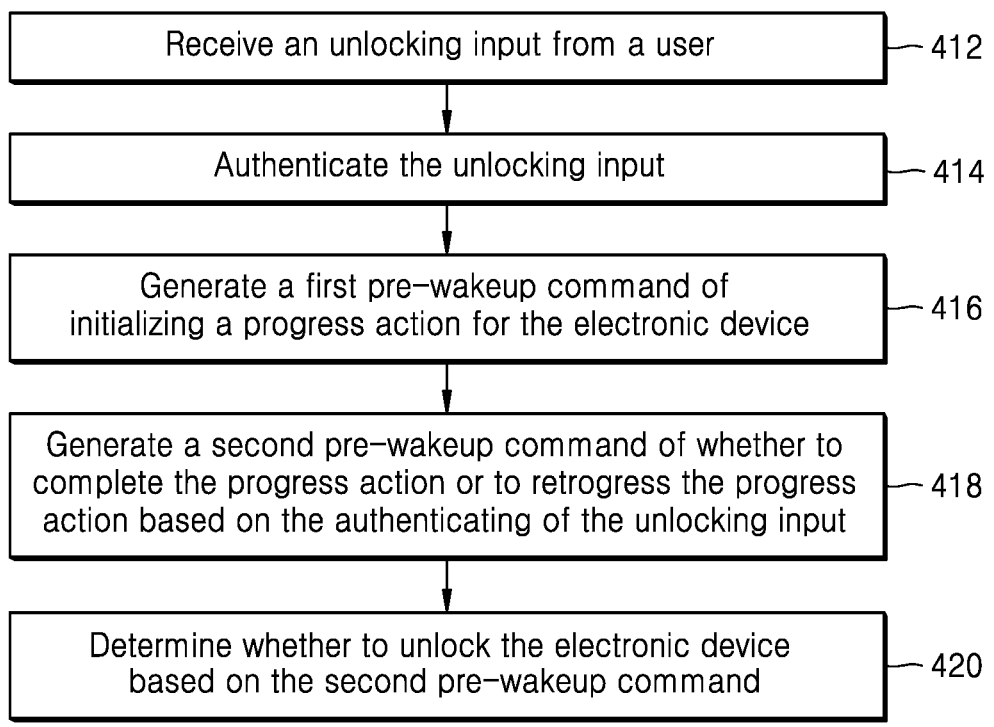
FIG. 4B illustrates a flow diagram for managing unlocking of an electronic device, according to an embodiment.

FIG. 4B illustrates a flow diagram for managing unlocking of an electronic device, according to an embodiment.

In operation 412, the input sensor 206 may receive an unlocking input from a user of the electronic device 200. The unlocking input may include, but not limited to, a biometric input, a touch input, a push button input and so forth, the biometric input may include a fingerprint input, an iris input, a voice input, a face input, a vein input, and a palm printing input.

In operation 414, the processor 208 may authenticate the unlocking input to start the functionalities of the electronic device 200.

In operation 416, the processor 208 may generate a first pre-wake-up command which causes an initialization of a progress action for the electronic device 200. The progress action may include certain actions occurring during a wake-up from the locked state such as brightening a display, progressing a status bar, and so forth.

In operation 418, the processor 208 may generate a second pre-wakeup command of whether to complete the progress action or to retrogress the progress action based on the authenticating of the unlocking input. When the authenticating of the unlocking input meets a predetermined criteria, the second pre-wakeup command is determined to complete the progress action for the electronic device 200 and the processor determines to unlock the electronic device 200 in response to the completion of the progress action. In an embodiment, to perform the progress action may be to brighten a display 202*a* of the electronic device 200 gradually from a complete dark state and to a full brightness state of the display. The completion of the progress action may indicate that the display reaches the full brightness state. In an embodiment, to perform the progress action may be to progress or launch an application from a beginning state to a complete state which indicates a completion of launching the application. For example, a status bar may indicate a progress of launching an application on the display 202*a*. In another embodiment, to perform the progress action may include to launch a home screen of the electronic device 200, where the home screen includes a plurality of application icons. When the authenticating of the unlocking input fails to meet a predetermined criteria, the second pre-wakeup command is determined to retrogress the progress action for the electronic device 200 and the processor 208 may determine not to unlock the electronic device 200 in response to the retrogressing of the progress action. The retrogression of the progress action may include dimming or darkening a display 202a of the electronic device 200 gradually. In an embodiment, the retrogression may include stopping the progress action.

In operation 420, the processor 208 may determine whether to unlock the electronic device 200 based on the second pre-wakeup command.

In an embodiment, the processor 208 may re-authenticate the unlocking input for at least predetermined counter when the authenticating of the unlocking input fails to meet the predetermined criteria where the second pre-wakeup command may cause to stop or retrogress the progress action of the at least one module of the electronic device when the re-authenticating of the unlocking input again fails for the at least predetermined counter.

Figure 5:
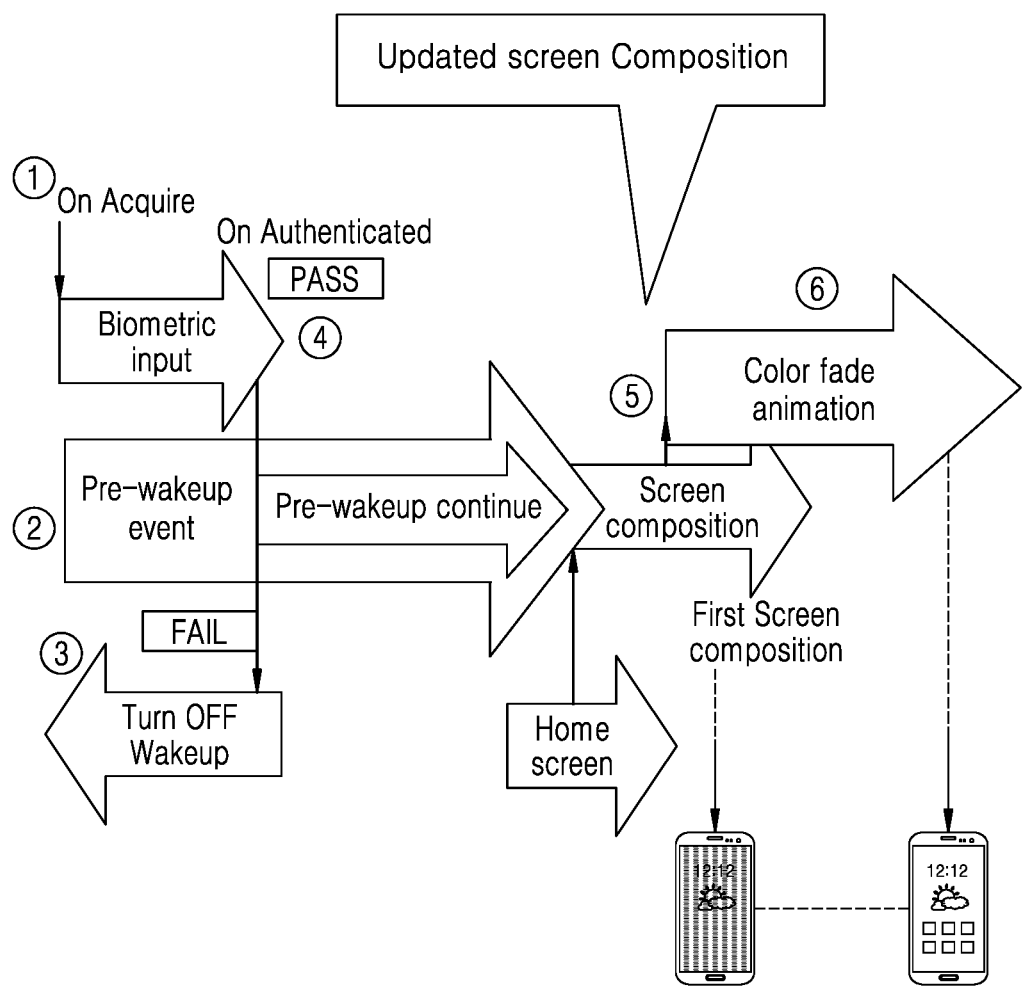
FIG. 5 is a diagram illustrating pre-wakeup event and pre-wakeup continue event performed on an electronic device, according to an embodiment.

FIG. 5 is a diagram illustrating pre-wakeup event and pre-wakeup continue event performed on an electronic device, according to an embodiment. Referring to FIG. 5, the input sensor 206 may acquire the biometric input of the user for unlocking the electronic device 200. The input sensor 206 provides information about the acquisition of the biometric input to the processor 208.

On acquiring the fingerprint, the processor 208 performs the authentication of the fingerprint (in operation 1) and the at least one pre-wakeup event (in operation 2) in parallel. Then at least one pre-wakeup event can be performed to trigger the initialization of at least one of the hardware modules 202 and/or the software modules 204 of the electronic device 200 by achieving the partial initialization state. Thus, performing the at least one pre-wakeup event before authentication of the event reduces the time required for unlocking the electronic device 200.

In parallel to performing the at least one pre-wakeup event, the processor 208 determines whether the authentication is successful or not. If the authentication of the fingerprint is not successful (FAIL), the processor 208 ramps down (at step 3) the initialization of the at least one of hardware modules 202 and/or the software modules 204 of the electronic device 200.

If the authentication of the fingerprint is successful (PASS), the processor 208 performs the at least one pre-wakeup continue event (in operation 4) to unlock the electronic device 200. The at least one pre-wakeup continue event involves continuing the progress of the initialization of at least one of the hardware modules 202 and/or the software modules 204 until achieving the near-ready state, composing the windows of the home screen and completing the progress of the initialization of the at least one of the hardware modules and the software modules 204 once the first window of the home screen is ready. The processor 208 composes (in operation 5) the plurality of windows of the home screen by collecting the information (such as, the current state, the content required to be placed on the home screen and so on) from the at least one of the hardware modules 202 and the software modules 204 which are in at least one of the partial initialization state and the near-ready state. Once the first window of the home screen is composed, the processor 208 completes the initialization of the hardware modules 202 and the software modules 204 by unlocking the electronic device 200.

Further, once the first window of the home screen is composed, the processor 208 adaptively (in operation 6) varies the brightness of the display 202a so that the window of the home screen can be visible to the user by performing the dynamic color-fade animation in parallel. For example, the processor 208 adaptively varies the brightness of the display 202a so that windows of the home screen can be visible to the user by performing the dynamic color-fade animation or the basic initial window of the home screen can be visible to the user in the quickest possible manner. In addition, the processor 208 starts composing the remaining windows of the home screen in parallel with varying the brightness of the display 202a. The processor 208 composes the remaining windows of the home screen by continuously collecting the information from the at least one of the hardware modules 202 and the software modules 204 which are initialized completely. Thus, turning-on the display 202a in parallel with composing the windows of the home screen can reduce the home screen composing time and screen visible time.

Figure 6:
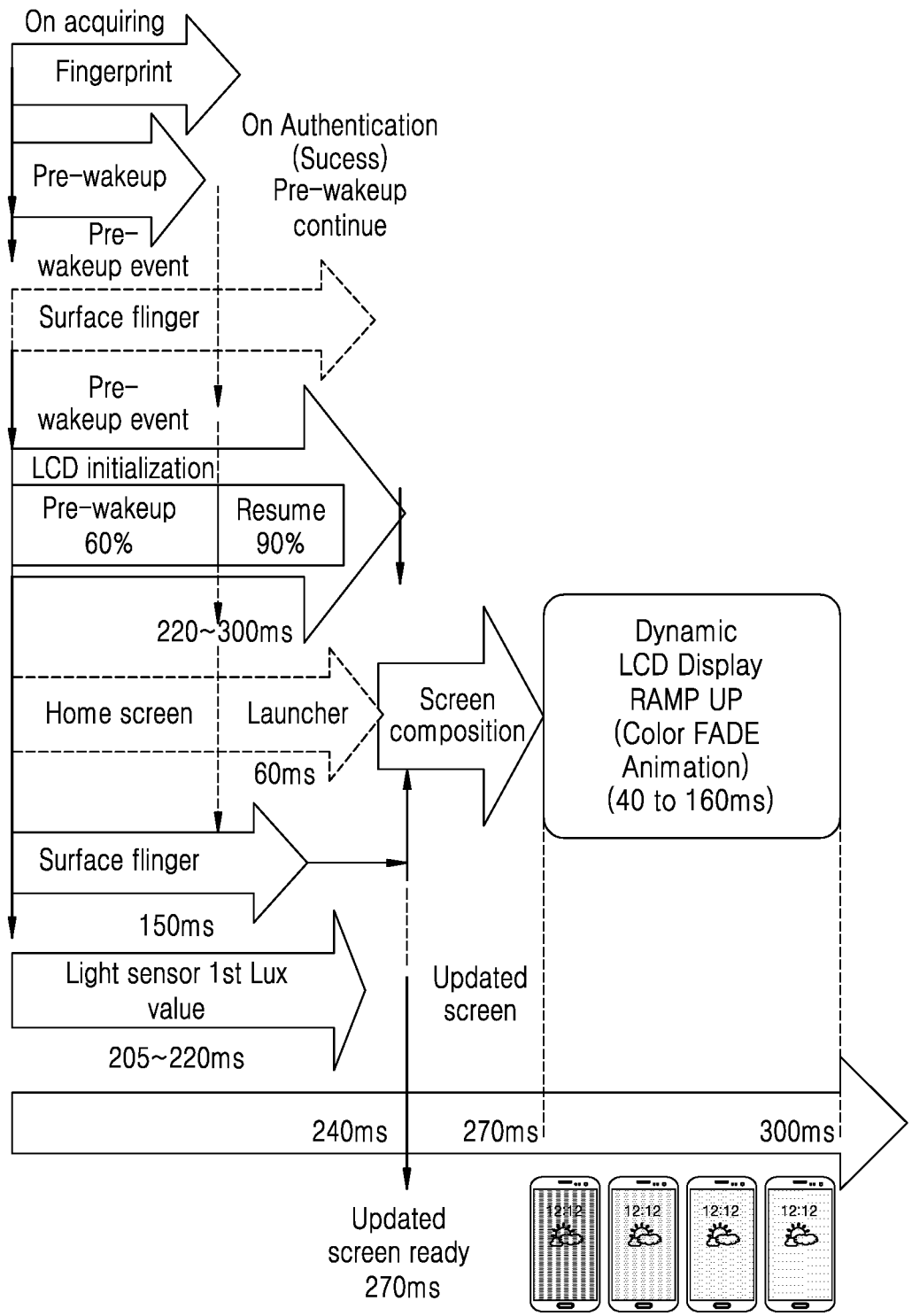
FIG. 6 is a diagram illustrating a fast unlocking of an electronic device using a pre-wakeup event, according to an embodiment.

FIG. 6 is a diagram illustrating a fast unlocking of an electronic device using a pre-wakeup event, according to an embodiment. Referring to FIG. 6, the user provides the user input for unlocking the electronic device 200. The input sensor 206 may acquire the user input and transmit the acquired fingerprint to the processor 208. The processor 208 performs the authentication of the user input and the at least one pre-wakeup event in parallel. In an example herein, the processor 208 may consume 120 ms to perform the pre-wakeup event and the authentication of the fingerprint at the same time.

The at least one pre-wakeup event can be performed to trigger the initialization of at least one of the hardware modules 202 and/or the software modules 204 of the electronic device 200 by achieving a pre-defined partial initialization state. In an example herein, the display 202a and the ambient light sensor are considered as the hardware modules and the status bar application module and the launcher application module are considered as the software modules. In order to perform the at least one pre-wakeup event, the processor 208 generates the at least one pre-wakeup event command and sends the at least one pre-wakeup event to the hardware modules 202 and the software modules 204 through the associated managing units. In an example herein, the processor 208 sends the at least one pre-wakeup command to the managing unit associated with the display 202a and the sensor manager unit associated with the ambient light sensor, the status bar application module and the launcher module. The managing unit enables the display 202a to perform the preparatory activities until achieving the partial initialization/wakeup state. In an example herein, the display 202a can be moved to 60% (partial) of the initialized state. The sensor managing unit enables the ambient light sensor to perform partial functions such as estimating the Lux value for the display 202a or the like. Further, the sensor managing unit enables the status bar application module and the launcher module to prepare the contents by collecting the information from the hardware modules 202, other software modules 204, the functionalities, the services, the applications and so on present in the electronic device 200.

Once the authentication of the user input is completed, the processor 208 determines a result of the authentication. In an example herein, consider that the authentication of the user input is successful. On determining that the authentication is successful, the processor 208 performs the at least one pre-wakeup continue event. In order to perform the at least one pre-wakeup continue event, the processor 208 issues the at least one pre-wakeup continue command to the managing unit and the sensor managing unit. The managing unit enables the display 202a to resume performing of the preparatory activities until achieving the near-ready state. In an example herein, the display 202a can be moved to 90%-100% of initialized state (the near-ready state) by consuming 220 ms-300 ms. The sensor managing unit enables the ambient light sensor, the status bar application module and the launcher module to resume preparing a first content that needs to be displayed on the home screen. In an example herein, on receiving the pre-wakeup continue command, the ambient light sensor can provide a first Lux value for the LCD display 202a by consuming 205-220 ms, the status bar application module may prepare a first content by consuming 150 ms and the launcher module may consume 60 ms to prepare a first content. The processor 208 collects at least one of information about the current state from the display 202a, information about the first Lux value from the ambient light sensor, the first content from the status bar application module and the first content from the launcher module. Based on the collected information, the processor 208 starts composing the windows of the home screen. In an example herein, the processor 208 may compose the first window of the home screen by consuming 270 ms. Once the first window is composed, the processor 208 initiates the color-fade animation to turn on the backlight of the display 202a. In an example, the color-fade animation involves performing dynamic ramp up of the backlight of the display 202a. The processor 208 further composes the remaining windows of the home screen while performing the color-fade animation. Further, the duration of the color-fade animation depends on the time taken for unlocking the electronic device 200 (the complete initialization/wakeup of the display 202a, the ambient light sensor, the status bar application module, the launcher module and so on). In an example herein, the processor 208 consumes 40 to 160 ms for performing the color-fade animation.

Figure 7:
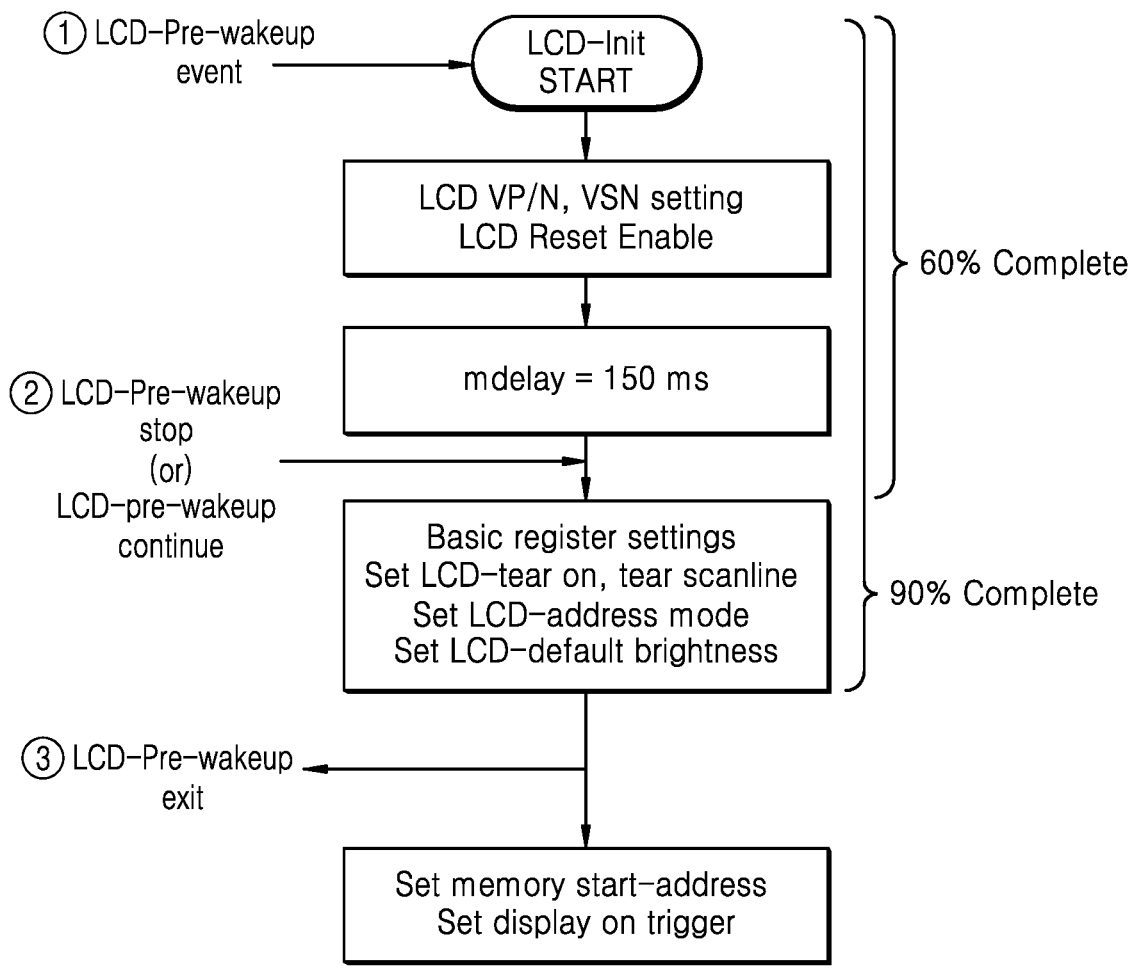
FIG. 7 is a diagram illustrating initialization of a progress action in an electronic device, according to an embodiment.

FIG. 7 is a diagram illustrating initialization of a progress action in an electronic device, according to an embodiment.

The processor 208 may send the pre-wakeup command along with the partial initialization/wakeup state to the display 202a through the managing unit associated with the display 202a on acquiring the biometric input of the user. On receiving the pre-wakeup event command from the managing unit, a driver of the display 202a starts performing the preparatory activities with delay (for example 150 ms) to move the display 202a to the partial wakeup state. In an example herein, the partial wakeup state can be 60% of the wakeup state. Examples of the preparatory activities can be, but not limited to, resetting LCD, enabling the LCD, setting LCD specific clock registers, row/column specific registers with their respective clock rates such as (VSN, VP/N and so on). Once the display 202a is moved to 60% of the wakeup state, the driver stops performing the remaining preparatory activities.

On receiving the pre-wakeup continue command along with the near-ready state (for example: 90% of the wakeup state) from the processor 208 through the surface flinger unit, the driver of the LCD display 202a resumes the preparatory activities to move the LCD display 202a to the 90% of the wakeup state. Examples of the preparatory activities performed after receiving the pre-wakeup continue command can be, but is not limited to, configuring basic register settings, setting scan line for row and column, a LCD-address mode, a LCD-default brightness or the like.

On receiving the full wakeup command from the processor 208 through the managing unit, the driver of the display 202a performs the preparatory activities to complete the initialization of the display 202a. Examples of the preparatory activities performed to complete the initialization of the display 202a can be, but is not limited to, loading the address of the memory 210 to fetch the first window screen/the frame of the home screen, triggering a display option to display the first window screen of the home screen and so on.

Figure 8A:
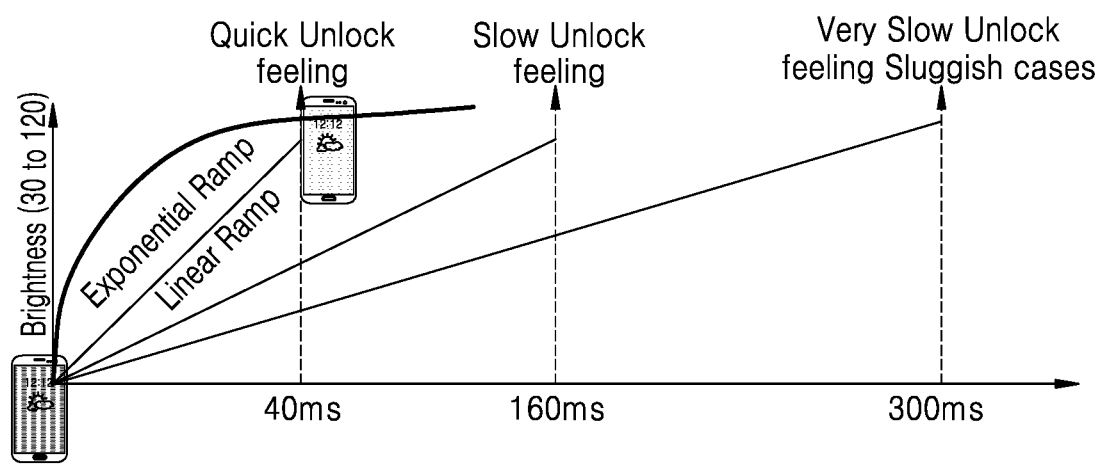
FIGS. 8A, 8B and 8C are example diagrams illustrating a dynamic color fade animation performed during unlocking of an electronic device, according to an embodiment.
Figure 8B:
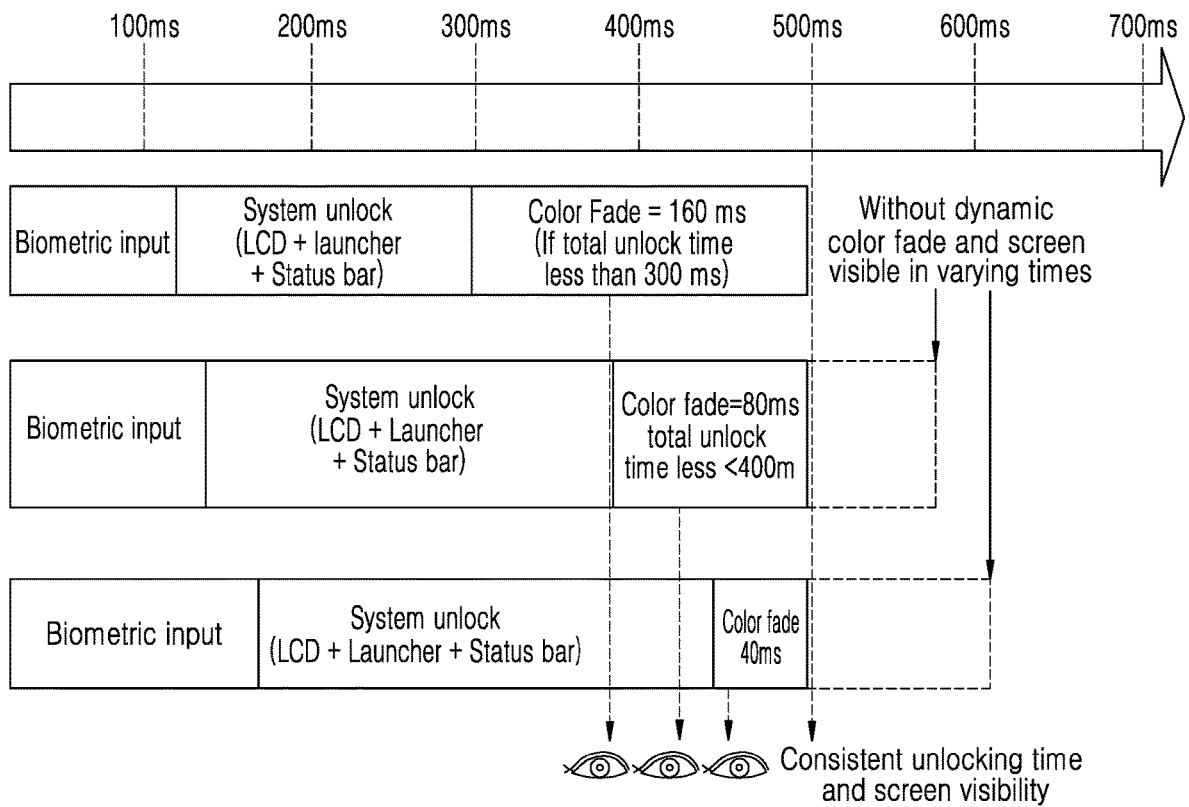
Figure 8C:
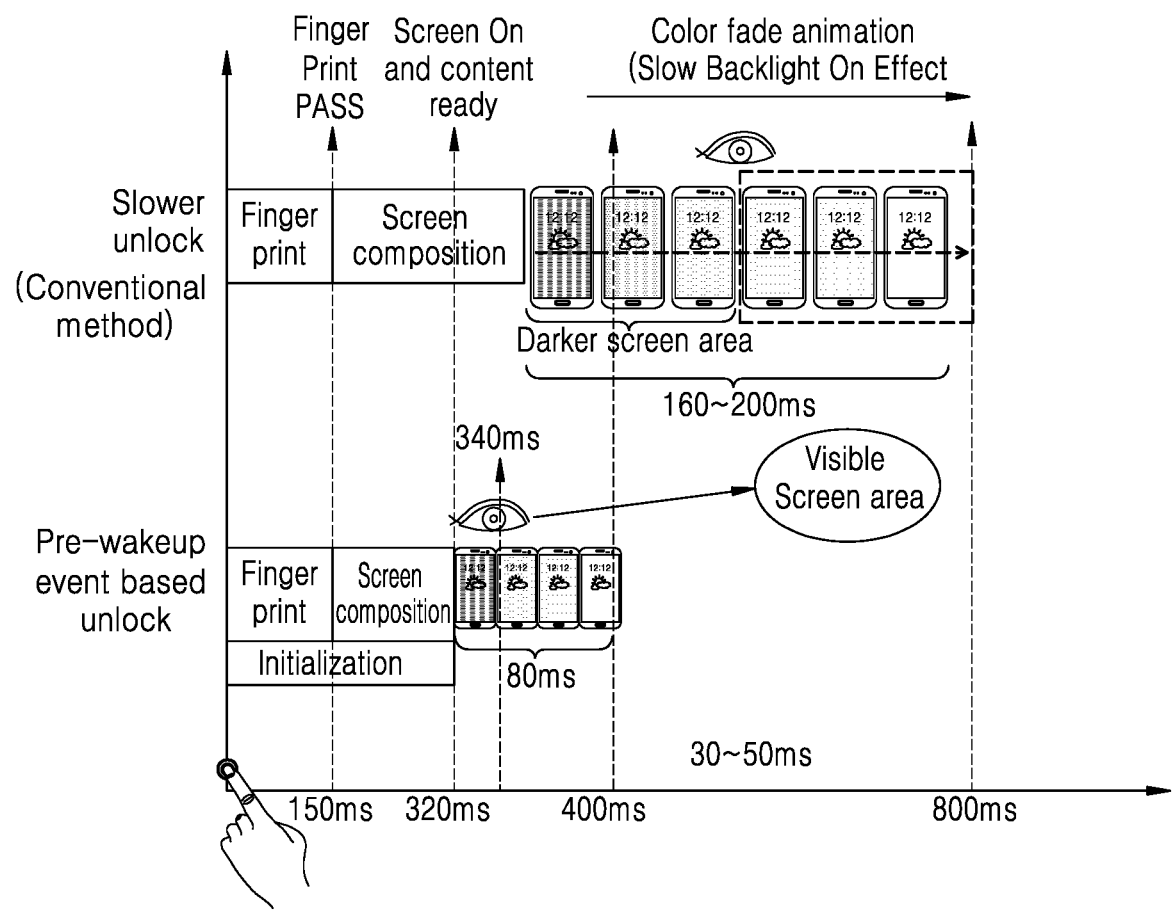

FIGS. 8A, 8B and 8C are example diagrams illustrating a dynamic color fade animation performed during unlocking of an electronic device, according to an embodiment.

Embodiments herein further explained the dynamic color-fade animation by considering the display 202a, but it may be obvious to a person of ordinary skill in the art that any other display can be considered. In an example, once the first window of the home screen is composed, the processor 208 performs the dynamic color-fade animation to turn on the backlight gradually in increment steps as shown in picture of the display 202a while unlocking the electronic device 200. The processor 208 prepares the remaining windows of the home screen in parallel with the dynamic color-fade animation.

Referring to FIG. 8A, an electronic device 200 follows a linear ramp up animation style to turn on the backlight of the display 202a. However, the linear ramp up animation style is a slow animation style with fixed duration, which further gives perception to the user of slower unlock. In contrast, embodiments herein enable the processor 208 to follow the exponential ramp up style animation (for example: Quint −90 as illustrated in FIG. 8A) to perform the dynamic color-fade animation, which has the fastest animation effect. Further, the processor 208 starts performing the dynamic color-fade animation using the lower brightness value (yet visible) so that the animation in darker areas can be avoided.

In an embodiment, the processor 208 selects the duration for performing the color-fade animation based on the time taken for unlocking the electronic device 200 (complete wake up of the hardware modules 202 and/or the software modules 204). In an example scenario, referring to FIG. 8B, consider the fingerprint as the biometric input, the LCD display 202a as the hardware module 202 and the status bar application module and the launcher module as the software modules of the electronic device 200. In such scenario, the duration of the dynamic color-fade animation depends on the total time consumed for complete wake up of the display 202a, the status bar application module and the launcher module (unlocking of the electronic device 200). Consider an example scenario, where a total time consumed for unlocking the electronic device 200 is less than 300 ms. In such scenario, the duration of the dynamic color-fade animation may be 160 ms. In another example scenario, a total time consumed for unlocking the electronic device 200 is above 300 ms and less than 400 ms. In such scenario, the duration of the dynamic color-fade animation may be 80 ms. In another example scenario, a total time consumed for unlocking the electronic device 200 is above 400 ms. In such scenario, the duration of the dynamic color-fade animation may be 40 ms. Thus, performing the dynamic color-fade animation provides consistent home screen visibility and reduces the unlocking time in sluggish conditions (when the electronic device 200 performance is slow).

In an embodiment, the display 202a can be turned on without performing the color-fade animation. Thus, the brightness of the home screen can be delayed in variable bases (illustrated using dotted lines in FIG. 8B)

Consider another example, where the display 202a can be turned on by performing the color-fade animation with slow backlight ON effect. The color-fade animation with slow backlight ON effect can be performed only after preparing all the windows of the home screen. The duration of the color-fade animation may not be estimated dynamically. Thus, performing the color-fade animation with slow backlight ON effect can consume more duration, which results in the delayed home screen visibility. For example, the duration of color-fade animation with slow backlight ON effect may be 160-200 ms as illustrated in FIG. 8C.

In contrast, embodiments herein enable the processor 208 to perform the dynamic color-fade animation once the first window of the home screen is composed. The processor 208 decides the duration of the dynamic color-fade animation based on the time consumed for unlocking the electronic device 200. Thus, the dynamic backlight duration helps to auto-adapt in the sluggish cases. For example, if total unlock time is 320 ms, the processor 208 performs the dynamic color-fade animation of 80 ms as illustrated in FIG. 8C.

Figure 9:
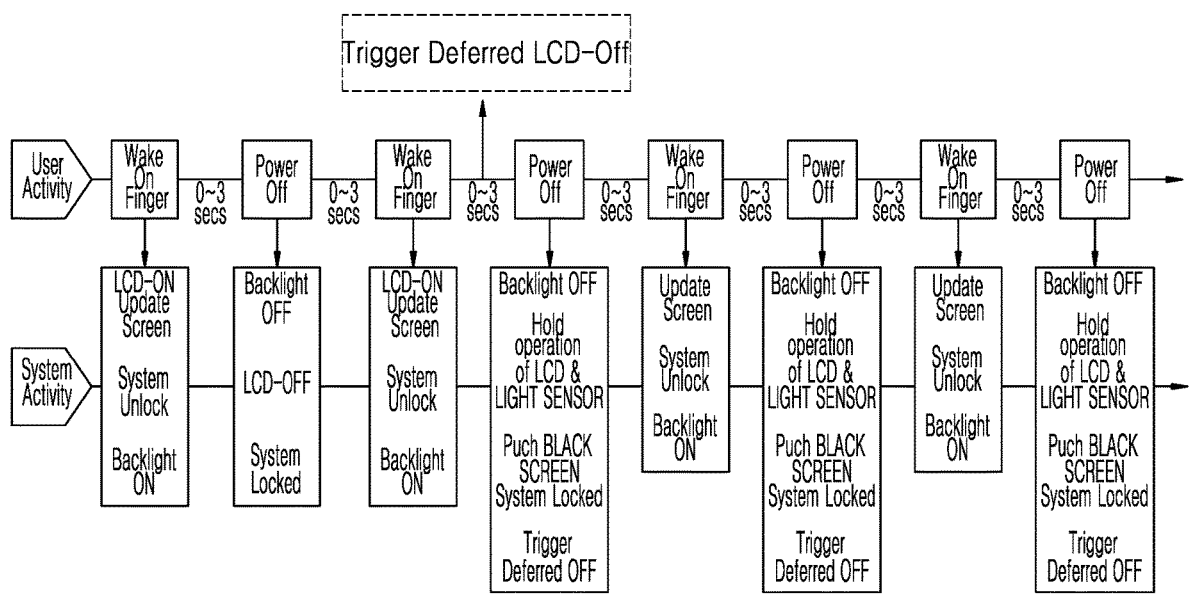
FIG. 9 is an example diagram illustrating a consecutive unlocking scenario, according to an embodiment.

FIG. 9 is an example diagram illustrating a consecutive unlocking scenario, according to an embodiment.

Embodiments herein enable the processor 208 to determine the back-to-back unlocking scenario (the wakeup followed by the power OFF and immediately followed by another biometric wakeup within the pre-defined duration (for example: 5 seconds) using learning and predictive techniques. On determining the back-to-back unlocking scenario, the processor 208 only turns off the backlight of the display 202a and enables the hardware modules and/or the software modules to be in the current state.

In an embodiment, the processor 208 determines the wakeup of the electronic device followed by the power off and immediately followed by another acquisition of the user input within 5 seconds (the pre-defined duration). In such scenario, the processor 208 only turns off the backlight of the display 202a by pushing the black-screen and holds operations of the hardware modules 202 and/or the software modules 204. In an example herein, the processor 208 holds the operation of the display 202a and the light sensor, since the display 202a OFF and the light sensor OFF is deferred for very short pre-defined duration of time. Thus, the proposed method enables reducing power consumption.

Embodiments herein perform a pre-wakeup event in parallel with authentication of the user input for unlocking an electronic device 200. The pre-wakeup event can be performed for partial wakeup of at least one of hardware modules and/or software modules of the electronic device 200. Performing the pre-wakeup event acts as a power saving solution for accidental biometric based wake ups/unlocking such as, but not limited to, accidental human skin touch, wrong finger usage and so on. Embodiments herein perform a pre-wakeup continue event on a successful authentication of the user input. The pre-wakeup continue event can be for completing the initialization of the at least one of the hardware modules and/or the software modules to unlock the electronic device 200. Thus, performing the pre-wakeup event on acquiring the user input and performing the pre-wakeup continue event based on the successful authentication of the biometric input results in a faster unlock of the electronic device 200.

Embodiments herein perform a dynamic color-fade animation to vary brightness of a display so that screen displayed on the display can be visible to a user while unlocking the electronic device 200. The dynamic color-fade animation can be performed by selecting duration based on total unlock duration. Thus, the dynamic color-fade animation helps to cover-up in-consistencies in unlocking speed. Further, the dynamic color-fade animation can be performed by following an exponential ramp up style which provides quick unlock effect.

Embodiments herein perform the dynamic color-fade animation once a first screen of a home screen is composed and compose remaining screens of the home screen in parallel with the dynamic color-fade animation. Thus, providing early screen visibility to the user.

Embodiments herein further determine a consecutive unlocking operation with dynamic self-configured timeout values and defer triggering of at least one hardware module. Thus, saving power as well as improving unlocked performance in repeated unlock ON and OFF operation.

The embodiment provides a method for managing unlocking of the electronic device 200, the method including acquiring, by the electronic device 200, at least one biometric input from a user for unlocking the electronic device 200, performing, by the electronic device, a first action and at least one second action in parallel based on the acquired at least one biometric input, wherein the first action includes authenticating the acquired at least one biometric input and the at least one second action includes performing a pre-wakeup event for initialization of at least one module of the electronic device 200 partially, and performing unlocking, by the electronic device 200, by performing a pre-wakeup continue event based on a successful authentication of the at least one biometric input, wherein the pre-wakeup continue event is performed to complete the initialization of the at least one module of the electronic device (200).

In an embodiment, the method further comprises ramping down, by the electronic device 200, the initialization of the at least one module of the electronic device 200 based on an unsuccessful authentication of the at least one biometric input.

In an embodiment, the at least one module includes at least one of at least one hardware module and at least one software module.

In an embodiment, performing the pre-wakeup event includes generating a pre-wakeup command on acquiring the at least one biometric input from the user, wherein the pre-wakeup command includes information about a partial initialization state for the at least one module of the electronic device 200, and issuing the pre-wakeup command to the at least one module of the electronic device 200, wherein the at least one module performs at least one preparatory activity by achieving the partial initialization state on receiving the pre-wakeup command.

In an embodiment, wherein performing the pre-wakeup event includes performing complete initialization of the at least one module when power consumption of the initialized at least one module is negligible and based on availability of a processor 208.

In an embodiment, wherein performing the pre-wakeup continue event includes performing a near-ready state initialization of the at least one module of the electronic device 200, composing at least one window of a home screen that is to be displayed on a display 202a, and completing the initialization of the at least one module of the electronic device 200 after composing a first window of the at least one window of the home screen.

In an embodiment, the performing the near-ready state initialization of the at least one module of the electronic device 200 includes generating a pre-wakeup continue command on determining the successful authentication of the at least one biometric input, wherein the pre-wakeup continue command includes information about a near-ready state for the at least one module of the electronic device 200, and issuing the pre-wakeup command to the at least one module of the electronic device 200 for continuing the initialization of the at least one module of the electronic device until achieving the near-ready state, wherein the at least one module continues performing the at least one preparatory activity by achieving the near-ready state on receiving the pre-wakeup continue command.

In an embodiment, the completing the initialization of the at least one module (202, 204) includes generating a full wakeup command after composing the first window of the home screen, and issuing the full wakeup command to the at least one module of the electronic device 200 for the complete initialization.

In an embodiment, the method further includes performing a dynamic color-fade animation by turning ON a display control hardware of the display (202a) while unlocking the electronic device (200), wherein performing dynamic color-fade animation includes varying brightness value of the display (202a) in incremental steps, and resuming composition of the at least one window of the home screen while performing the dynamic color-fade animation.

In an embodiment, the method further includes determining, by the electronic device 200, a back-to-back unlocking operation, wherein the back-to-back unlocking operation refers to detection of unlocking of the electronic device 200 followed by locking of the electronic device 200 and immediately followed by another unlocking of the electronic device 200 within a pre-defined duration, and performing, by the electronic device 200, at least one action on detecting the back-to-back operation, wherein the at least one action includes turning OFF the backlight by at least one of a display control hardware of the display 202a and pushing a black screen and locking the electronic device 200, holding at least one operation of the at least one module of the electronic device 200.

In an embodiment, provided is a method for managing unlocking of an electronic device 200, the method including receiving, by the electronic device 200, at least one biometric input from a user, checking, by the electronic device 200, an authenticity of the received at least one biometric input, issuing in parallel, by the electronic device 200, a pre-wakeup command to pre-defined at least one hardware module 202 and at least one software module 204, wherein the pre-wakeup command includes partial initialization of the at least one hardware module 202 and the at least one software module 204.

In an embodiment, the method further includes issuing, by the electronic device 200, a pre-wakeup continue command to complete the initialization of the at least one hardware module 202 and the at least one software module 204 when the authentication of the at least one biometric input is successful.

In an embodiment, the method further includes stopping, by the electronic device 200, the initialization of the pre-defined at least one hardware module 202 and at least one software module 204 when the authentication of the at least one biometric input is not successful.

In an embodiment, the method further includes stopping a generation of the pre-wake command when the authentication of the at least one biometric input fails consecutively for a pre-defined number of times.

The embodiments disclosed herein can be implemented through at least one software program running on at least one hardware device and performing network management functions to control the elements. The elements shown in FIG. 2 and FIG. 3 can be at least one of a hardware device, or a combination of hardware device and software module.

The embodiments disclosed herein describe methods and systems for managing unlocking of an electronic device. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method for managing unlocking of an electronic device, the method comprising:
   receiving an unlocking input from a user;
   authenticating the unlocking input;
   generating a first pre-wakeup command of partially initializing a progress action for the electronic device, the progress action comprising launching a home screen of the electronic device;
   initializing the progress action in parallel with the authenticating;
   generating a second pre-wakeup command of whether to continue and complete the progress action or to retrogress the progress action in response to a completion of the authenticating of the unlocking input; and
   determining whether to unlock the electronic device based on the second pre-wakeup command.

2. The method of claim 1, further comprising:
   in response to the authenticating of the unlocking input meeting a predetermined criteria, determining that the second pre-wakeup command is used to complete the progress action for the electronic device,
   wherein the determining of whether to unlock the electronic device comprises determining to unlock the electronic device in response to completing the progress action.

3. The method of claim 2, wherein the progress action comprises gradually performing a progress action for at least one hardware module of the electronic device.

4. The method of claim 2,
   wherein the progress action comprises gradually brightening a display of the electronic device, and
   wherein the completing of the progress action comprises causing the display to reach a full brightness state.

5. The method of claim 2, wherein the progress action comprises gradually performing a progress action for at least one software module of the electronic device.

6. The method of claim 2, wherein the home screen comprises a plurality of application icons.

7. The method of claim 1, further comprising:
in response to the authenticating of the unlocking input failing to meet a predetermined criteria, determining that the second pre-wakeup command is used to retrogress the progress action for the electronic device,
wherein the determining of whether to unlock the electronic device comprises determining to refrain from unlocking the electronic device in response to the retrogressing of the progress action.

8. The method of claim 7, wherein the retrogressing of the progress action comprises gradually dimming a display of the electronic device.

9. The method of claim 7, wherein the retrogressing of the progress action comprises stopping the progress action.

10. The method of claim 7, further comprising:
re-authenticating the unlocking input for a predetermined counter in response to the authenticating of the unlocking input failing to meet the predetermined criteria,
wherein the second pre-wakeup command causes stopping or retrogressing the progress action of at least one module of the electronic device in response to the re-authenticating of the unlocking input failing for the predetermined counter.

11. The method of claim 1, wherein the authenticating of the unlocking input and the generating of the first pre-wakeup command are performed in parallel.

12. The method of claim 1, wherein the unlocking input comprises at least one biometric input.

13. The method of claim 12, wherein the at least one biometric input is selected among a fingerprint input, an iris input, a voice input, a face input, a vein input, and a palm printing input.

14. An apparatus for managing unlocking from a locked state, the apparatus comprising:
an input sensor configured to receive an unlocking input from a user; and
a processor configured to:
authenticate the unlocking input,
generate a first pre-wakeup command of partially initializing a progress action for the apparatus, the progress action comprising launching a home screen of the apparatus,
control to initialize the progress action in parallel with the authenticating,
generate a second pre-wakeup command of whether to continue and complete the progress action or to retrogress the progress action in response to a completion of the authenticating of the unlocking input, and
determine whether to unlock the apparatus from the locked state based on the second pre-wakeup command.

15. A non-transitory computer readable medium having an executable program which, when executed by at least one processor, instructs an electronic device to perform:
receiving an unlocking input from a user;
authenticating the unlocking input;
generating a first pre-wakeup command of partially initializing a progress action for the electronic device, the progress action comprising launching a home screen of the electronic device;
initializing the progress action in parallel with the authenticating;
generating a second pre-wakeup command of whether to continue and complete the progress action or to retrogress the progress action in response to a completion of the authenticating of the unlocking input; and
determining whether to unlock the electronic device based on the second pre-wakeup command.

16. The method of claim 1, wherein the second pre-wakeup command is based on a result of whether the authenticating of the unlocking input meets a predetermined criteria.

* * * * *